(12) United States Patent
Wu

(10) Patent No.: US 12,244,903 B2
(45) Date of Patent: Mar. 4, 2025

(54) MULTIMEDIA DATA PROCESSING METHOD, APPARATUS, AND DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Qiliang Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 169 days.

(21) Appl. No.: 17/981,317

(22) Filed: Nov. 4, 2022

(65) Prior Publication Data
US 2023/0059637 A1 Feb. 23, 2023

Related U.S. Application Data

(63) Continuation of application No. PCT/CN2022/088177, filed on Apr. 21, 2022.

(30) Foreign Application Priority Data

May 13, 2021 (CN) .......................... 202110522973.1

(51) Int. Cl.
*H04N 21/4788* (2011.01)
*H04L 51/10* (2022.01)
*H04N 21/431* (2011.01)

(52) U.S. Cl.
CPC ......... *H04N 21/4788* (2013.01); *H04L 51/10* (2013.01); *H04N 21/4316* (2013.01)

(58) Field of Classification Search
CPC ........... H04N 21/4788; H04N 21/4316; H04N 21/41407; H04N 21/44016;
(Continued)

(56) References Cited

U.S. PATENT DOCUMENTS 11,490,036 B1 * 11/2022 Uavechanichkul .......................... H04N 21/41407
2008/0187279 A1 * 8/2008 Gilley ................ H04N 21/2543 386/250

(Continued)

FOREIGN PATENT DOCUMENTS

CN 104461474 A 3/2015
CN 109445894 A 3/2019
(Continued)

OTHER PUBLICATIONS

Tencent Technology, Extended European Search Report and Supplementary Search Report, EP Patent Application No. 22806461.4, Mar. 1, 2024, 52 pgs.
(Continued)

*Primary Examiner* — Cynthia M Fogg
(74) *Attorney, Agent, or Firm* — Banner & Witcoff, Ltd.

(57) ABSTRACT

An electronic device presents, on a display of the electronic device, a session interface. The session interface includes at least one multimedia message. The electronic device determines a first multimedia message in response to a first selection operation received through the session interface. The first multimedia message carries first multimedia data. The electronic device determines second multimedia data in response to a second selection operation. The electronic device presents a synthesis interface in response to receiving a multimedia synthesis instruction, and performs synthesis processing on the first multimedia data and the second multimedia data to obtain synthesized multimedia data.

20 Claims, 19 Drawing Sheets

(58) Field of Classification Search
CPC ....... H04N 21/47205; H04N 21/23614; H04N 21/2365; H04N 21/23424
USPC .......................................................... 725/32
See application file for complete search history.

(56) References Cited

U.S. PATENT DOCUMENTS

| | | | | |
|---|---|---|---|---|
| 2011/0249024 | A1* | 10/2011 | Arrasvuori | G06F 3/017 |
| | | | | 715/863 |
| 2014/0229835 | A1* | 8/2014 | Ravine | H04L 65/61 |
| | | | | 709/206 |
| 2021/0225406 | A1* | 7/2021 | Han | H04N 21/44016 |
| 2022/0180893 | A1* | 6/2022 | Lihan | G06F 3/167 |
| 2022/0206738 | A1* | 6/2022 | Anvaripour | G11B 27/031 |
| 2022/0279239 | A1* | 9/2022 | Wang | H04N 21/8456 |
| 2022/0329908 | A1* | 10/2022 | Gao | H04N 21/4722 |

FOREIGN PATENT DOCUMENTS

| | | |
|---|---|---|
| CN | 111383175 A | 7/2020 |
| CN | 112286608 A | 1/2021 |
| WO | WO 2018095174 A1 | 5/2018 |
| WO | WO 2020124228 A1 | 6/2020 |
| WO | WO 2020221105 A1 | 11/2020 |

OTHER PUBLICATIONS

Tencent Technology, ISR, PCT/CN2022/088177, Jun. 28, 2022, 3 pgs.
Tencent Technology, WO, PCT/CN2022/088177, Jun. 28, 2022, 5 pgs.
Tencent Technology, IPRP, PCT/CN2022/088177, Nov. 14, 2023, 6 pgs.

* cited by examiner

MULTIMEDIA DATA PROCESSING METHOD, APPARATUS, AND DEVICE, COMPUTER-READABLE STORAGE MEDIUM, AND COMPUTER PROGRAM PRODUCT

RELATED APPLICATION

This application is a continuation application of PCT Patent Application No. PCT/CN2022/088177, entitled "MULTIMEDIA DATA PROCESSING METHODS, DEVICES, EQUIPMENT, COMPUTER-READABLE STORAGE MEDIA AND COMPUTER PROGRAM PRODUCTS" filed on Apr. 21, 2022, which claims priority to Chinese Patent Application No. 202110522973.1, filed with the State Intellectual Property Office of the People's Republic of China on May 13, 2021, and entitled "MULTIMEDIA DATA PROCESSING METHOD, APPARATUS, AND DEVICE, COMPUTER-READABLE STORAGE MEDIUM, AND COMPUTER PROGRAM PRODUCT," all of which are incorporated herein by reference in their entirety.

FIELD OF THE TECHNOLOGY

This application relates to data processing technology, and in particular, to a multimedia data processing method, apparatus, and device, a non-transitory computer-readable storage medium, and a computer program product.

BACKGROUND OF THE DISCLOSURE

With the development of mobile communication technology and smart terminals, people can communicate with each other in various forms through the smart terminal. Communication manners are no longer limited to text and voice chat, real-time video chat may further be conducted, or short videos may be transmitted. In addition, videos may further be forwarded to other friends, or transmitted to social platforms and short video platforms for sharing. In a current chat session, as shown in FIG. 1, a plurality of operation options may be presented when a user interacts with specific video in a session interface 101 (e.g., via a long press action, a press and hold action, etc.). For example, by clicking the forward icon, a single video may be forwarded, or a control 1021 for forwarding to a friend and a control 1022 for saving to the local may be presented by long-pressing a video playback interface 102 of a session application, thereby implementing video forwarding or storage. In addition, multiple videos can be selected, for example, by selecting the videos and forwarding them either individually or in combination, as shown in element 103 in FIG. 1. The video is forwarded to a friend in the form of a session message. In addition, a video in a session window may only be separately played. Even when the multiple videos are selected, merged, and forwarded to another session window, what is finally presented is still a piece of separate video, and the video content cannot be effectively deposited.

SUMMARY

Embodiments of this application provide a multimedia data processing method, apparatus, and device, a non-transitory computer-readable storage medium, and a computer program product, which may simplify the complexity of merging multimedia and improve operation efficiency.

The technical solutions in the embodiments of this application are implemented as follows:

According to an embodiment of this application, a multimedia data processing method is performed at a multimedia data processing device (e.g., an electronic device) that includes a display, the method includes:
  presenting a session interface, the session interface including at least one multimedia message;
  determining a first multimedia message in response to receiving a first selection operation through the session interface, the first multimedia message carrying first multimedia data;
  determining second multimedia data in response to receiving a second selection operation;
  displaying a synthesis interface in response to a multimedia synthesis instruction, the synthesis interface presenting the first multimedia data and the second multimedia data; and
  performing synthesis processing on the first multimedia data and the second multimedia data to obtain synthesized multimedia data.

According to an embodiment of this application, a multimedia data processing apparatus (e.g., an electronic device) includes:
  a first presentation module, configured to present a session interface, the session interface presenting at least one multimedia message;
  a first determining module, configured to determine a first multimedia message in response to a first selection operation received through the session interface, the first multimedia message carrying first multimedia data;
  a second determining module, configured to determine second multimedia data in response to a second selection operation;
  a second presentation module, configured to present a synthesis interface in response to a multimedia synthesis instruction, the synthesis interface presenting the first multimedia data and the second multimedia data; and
  a first synthesis module, configured to perform synthesis processing on the first multimedia data and the second multimedia data to obtain synthesized multimedia data.

According to an embodiment of this application, a multimedia data processing device includes a display;
  memory, configured to store executable instructions; and
  a processor, configured to implement the multimedia data processing method provided in this embodiment of this application when executing the executable instructions stored in the memory.

According to an embodiment of this application provides, a non-transitory computer-readable storage medium stores executable instructions, the executable instructions, when executed by a processor, implements the multimedia data processing method provided in this embodiment of this application.

According to an embodiment of this application, a computer program product or a computer program includes computer instructions. The computer instructions are stored in a non-transitory computer-readable storage medium. A processor of a computer device reads the computer instructions from the computer-readable storage medium, and executes the computer instructions, to cause the computer device to perform the multimedia data processing method in this embodiment of this application.

This embodiment of this application has the following beneficial effects:

When multimedia data carried in the multimedia message needs to be synthesized after receiving the multimedia message or transmitting the multimedia message through a session application, first, the first selection operation triggered by the session interface is received. Then, the first multimedia message is determined in response to the first selection operation. Then, the second multimedia data is determined in response to the second selection operation. Synthesis processing is performed on the first multimedia data and the second multimedia data to obtain the synthesized multimedia data in response to the multimedia synthesis instruction. In the related art, when synthesizing the multimedia data using specialized video editing software, files in a file manager need to be located and then the merging needs to be performed. In the multimedia data processing method provided in this embodiment of this application, both receiving and editing of the multimedia data are completed in the session interface, and there is no need to switch to other software. In this way, the processing difficulty of merging videos may be reduced, thereby reducing the data processing volume of a terminal, improving the processing efficiency of the terminal, ensuring the continuity of operations, and improving the merging efficiency.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

In this embodiment of this application, various data information is involved, for example, first multimedia data, second multimedia data, third multimedia data, or the like. When this embodiment of this application is applied to actual products or technologies, permission or consent needs to be obtained, and the collection, use, and processing of related data comply with related laws, regulations, and standards of related countries and regions.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Embodiments of this application provide a multimedia data processing method, apparatus, and device, and a non-transitory computer-readable storage medium, which may resolve a problem that a video cannot be merged, shared, or saved in the session window, and the video content cannot be efficiently deposited and/or shared. Exemplary applications of the multimedia data processing device provided in this embodiment of this application are described below. The multimedia data processing device provided in this embodiment of this application may be implemented as various types of user terminals, such as a notebook computer, a tablet computer, a desktop computer, a set-top box, a mobile device (such as, a mobile phone, a portable music player, a personal digital assistant, a dedicated messaging device, a portable game device), or the like. Exemplary applications are described below when a device is implemented as a terminal (e.g., an electronic device).

Figure 1:
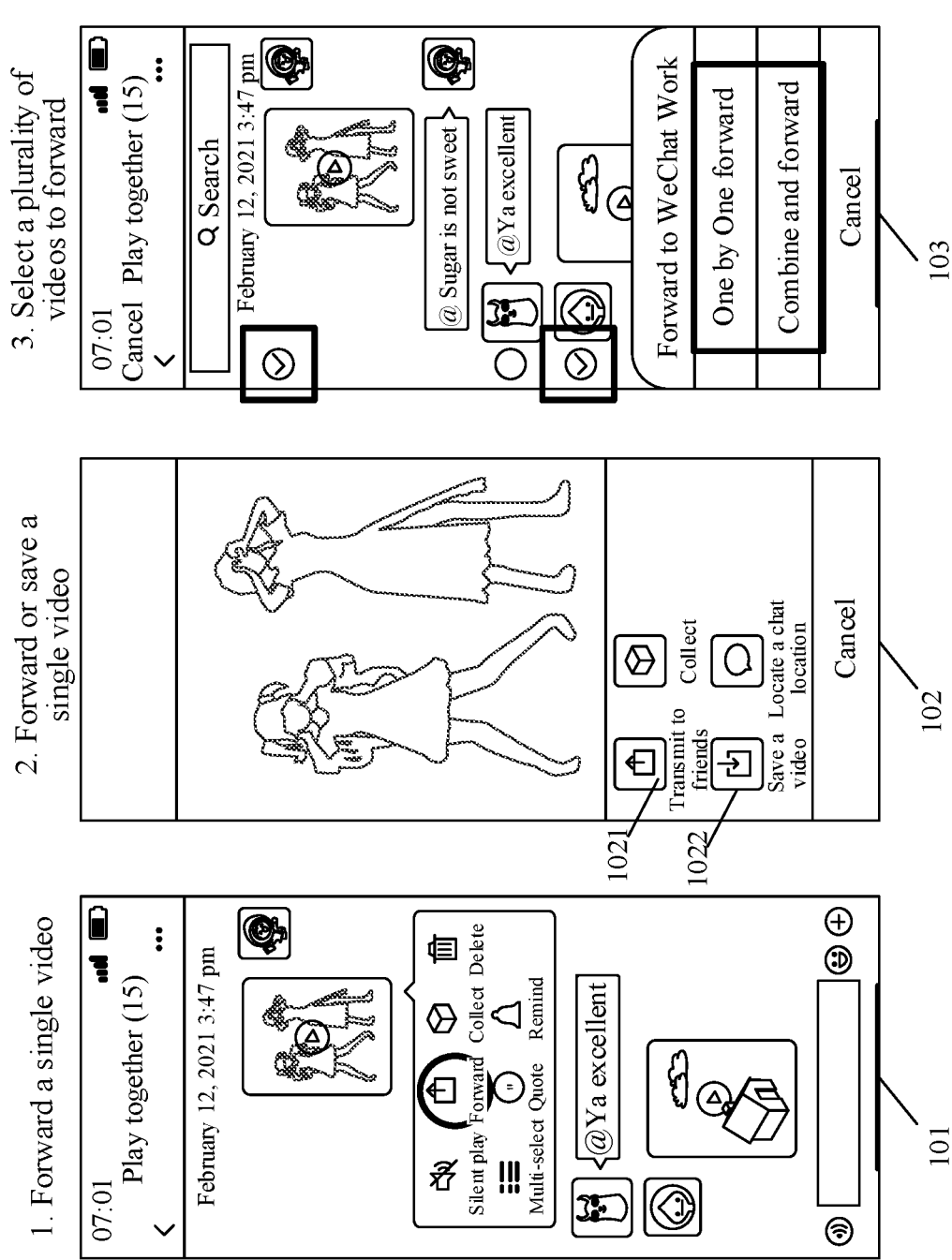
FIG. 1 is a schematic diagram of an interface forwarding a video or storing a video in the related art.
Figure 2:
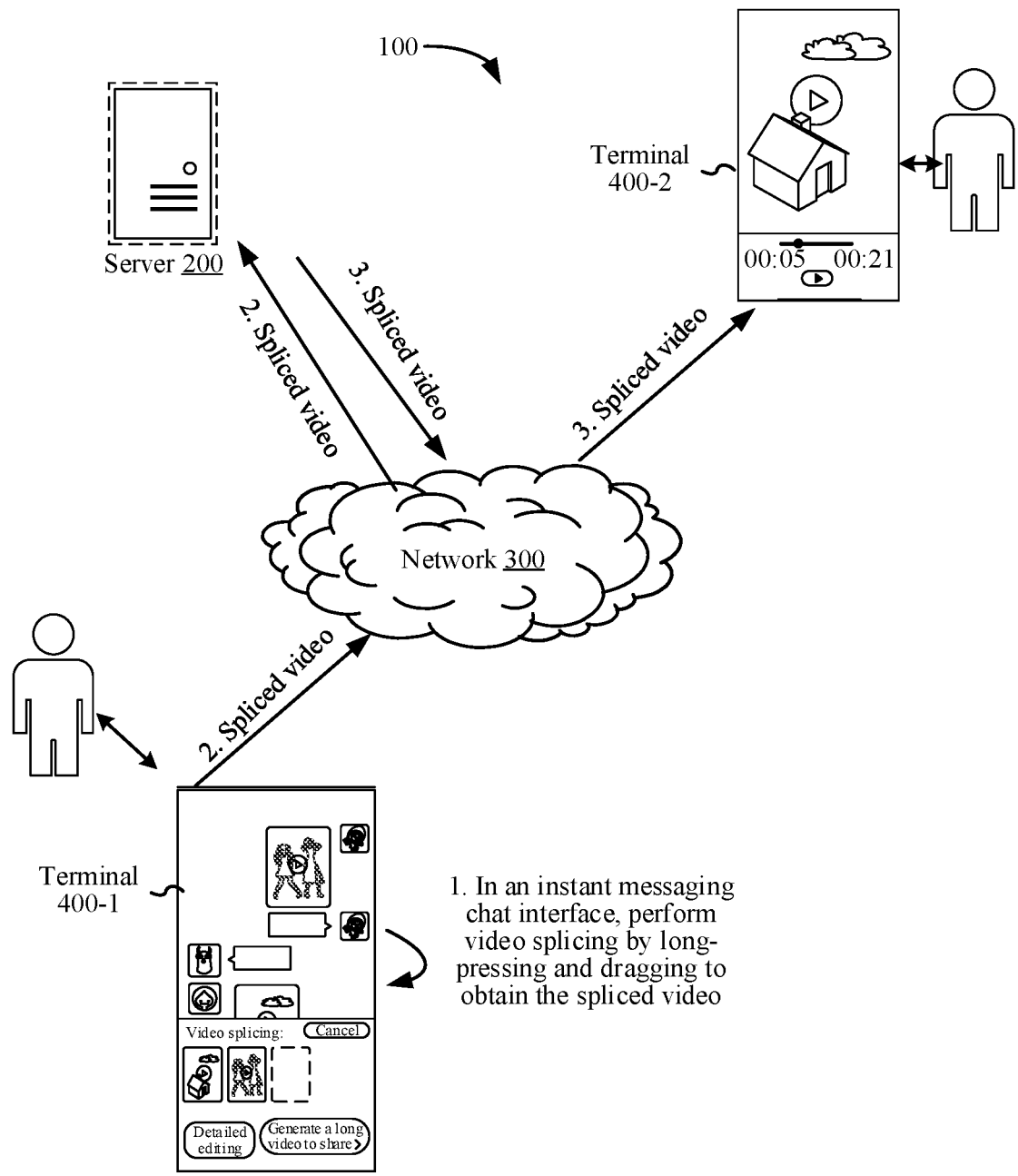
FIG. 2 is a schematic diagram of a network architecture of a multimedia data processing system according to an embodiment of this application.

FIG. 2 is a schematic diagram of a network architecture of a multimedia data processing system 100 according to an embodiment of this application. As shown in FIG. 2, the network architecture includes a server 200, a network 300, and a terminal 400, and exemplarily shows a terminal 400-1 and a terminal 400-2 in FIG. 2. The terminal 400-1 and the terminal 400-2 are connected to the server 200 through the network 300. The network 300 may be a wide area network or a local area network, or a combination of the two.

A session communication application is installed in the terminal 400-1 and the terminal 400-2, so that communication messages such as text, voice, video, and files may be transmitted. When the terminal 400-1 receives a multimedia message in a specific session window and needs to perform multimedia data splicing, the terminal 400-1 may trigger a long-press operation in a display region in which the first multimedia message is located. In this case, a first cover image corresponding to the first multimedia message is displayed in the session interface of the terminal 400-1 in a manner of a floating layer, and then the first cover image is dragged to a display region in which the second multimedia message is located. When the long-press operation is canceled, a synthesis interface is presented in the session interface of the terminal 400-1, and a splicing process is performed on the first multimedia data and the second multimedia data carried in the second multimedia message to obtain the synthesized multimedia data. Then, the synthesized multimedia data may be transmitted to the server 200 based on a sharing operation performed by the user, and then the server 200 transmits the synthesized multimedia data to the terminal 400-2.

In some embodiments, the server 200 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal 400 may be a smart phone, a tablet computer, a notebook computer, a desktop computer, a smart speaker, a smart watch, a smart in-vehicle terminal, or the like, but is not limited thereto. The terminal and the server may be directly or indirectly connected in a wired or wireless communication manner. This is not limited in the embodiments of the present invention.

Figure 3:
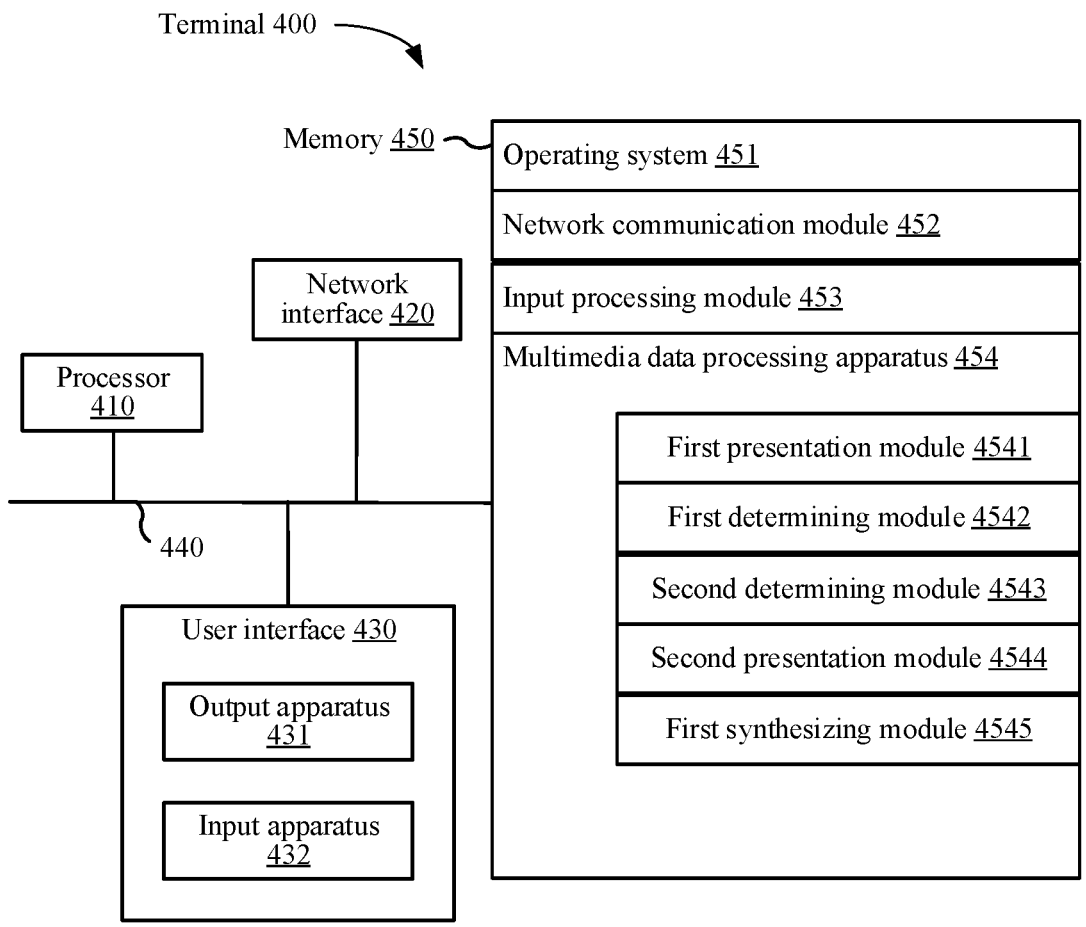
FIG. 3 is a schematic structural diagram of a terminal according to an embodiment of this application.

FIG. 3 is a structural diagram of a terminal 400 according to an embodiment of this application. The terminal 400 shown in FIG. 3 includes: at least one processor 410, a memory 450, at least one network interface 420, and a user interface 430. All the components in the terminal 400 are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses in FIG. 3 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component.

The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control member.

The memory 450 may be a removable memory, a non-removable memory, or a combination thereof. Exemplary hardware devices include a solid-state memory, a hard disk drive, an optical disc driver, or the like. In some embodiments, the memory 450 includes one or more storage devices physically away from the processor 410.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in the embodiments of this application is to include any other suitable type of memories.

In some embodiments, the memory 450 can store data to support various operations, and examples of the data include programs, modules, and data structures, or subsets or supersets thereof, as illustrated below.

An operating system 451 includes a system program configured to process various basic system services and perform hardware-related tasks, for example, a framework layer, a core library layer, and a driver layer, and is configured to implement various basic services and process hardware-related tasks.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

an input processing module 453 is configured to detect one or more user inputs or interactions from one of the one or more input apparatuses 432 and translate the detected input or interaction.

In some embodiments, the apparatus provided in this embodiment of this application may be implemented by using software. FIG. 3 shows a multimedia data processing apparatus 454 stored in the memory 450. The multimedia data processing apparatus may be software in a form such as a program or a plug-in, and includes the following software modules: a first presentation module 4541, a first determining module 4542, a second determining module 4543, a second presentation module 4545, and a first synthesis module 4555. These modules are logical modules, and therefore may be randomly combined or further divided according to a function to be implemented.

In this embodiment of this application, a presentation module (a first presentation module 4541, a second presentation module 4544, and other presentation modules) is configured to present information by using an output apparatus 431 (for example, a display screen or a speaker) associated with one or more user interfaces 430 (for example, a user interface configured to operate a peripheral device and display content and information).

The multimedia data processing method provided in this embodiment of this application is described with reference to an exemplary application and implementation of the terminal provided in this embodiment of this application.

Figure 4:
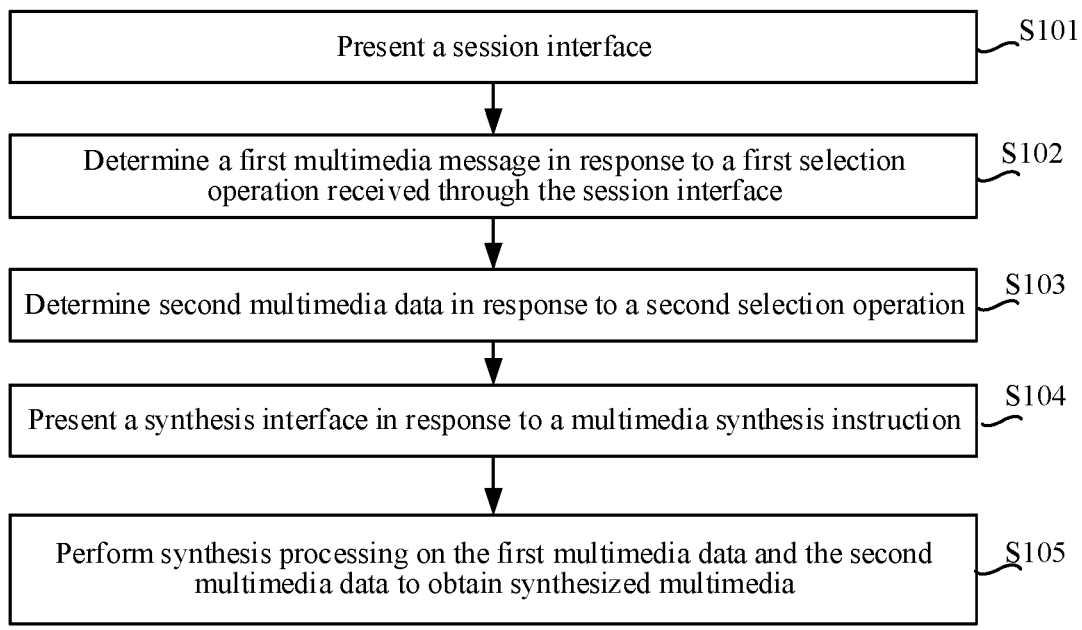
FIG. 4 is a schematic flowchart of an implementation of a multimedia data processing method according to an embodiment of this application.

This embodiment of this application provides a multimedia data processing method, which is applied to a multimedia data processing device. FIG. 4 is a schematic flowchart of an implementation of a multimedia data processing method according to an embodiment of this application. Each step is described below with reference to FIG. 4.

Step S101. Present a session interface.

The session interface may be an instant messaging chat interface, and may further be a short video viewing interface and other interfaces that present multimedia data. In some embodiments of this application, a description is made by using the session interface as an instant messaging chat interface as an example. When the session interface is the instant messaging chat interface, the session interface may present at least one multimedia message, and may further present a text chat message, a voice chat message, a file transmission message, or the like.

Step S102. Determine a first multimedia message in response to a first selection operation received through the session interface.

The first multimedia message may be a multimedia message transmitted by a user of the terminal. In some embodiments, the first multimedia message is a multimedia message transmitted by another user and received by the terminal. The first multimedia message carries first multimedia data, such as image data, video data, or voice data.

In an actual implementation process, the first selection operation may be a long-press operation by a user of the terminal. In some implementations, the first selection process may further be a long-press and drag operation by a user of the terminal.

Step S103. Determine second multimedia data in response to a second selection operation.

The second multimedia data is at least one of multimedia data carried in another multimedia message in the session interface, multimedia data carried in a multimedia message in another session interface, or locally stored multimedia data. In the step S103, in response to the second selection operation, the determined second multimedia data may be one piece of multimedia data, and may also multiple pieces (e.g., multiple files) of multimedia data. When selecting a plurality of pieces of multimedia data, selection may be performed through a plurality of selection operations, or a plurality of pieces of multimedia data may be selected in batches through one selection operation. For example, a plurality of pieces of multimedia data of the same type may be selected by one click, or multimedia data in a specific period of time may be selected by one click.

When the second multimedia data synthesized with the first multimedia data in the first multimedia message is carried in other multimedia messages in the current session interface, the first selection operation may be a long-press and drag operation. For example, a thumbnail of the first multimedia message may be displayed in response to an operation of long pressing the first multimedia message, and the thumbnail may be controlled to perform following movement in response to an operation of dragging the thumbnail. In addition, in response to detecting that the first selection operation acts on a second display region in which the second multimedia message is located, a preset duration is reached, and a long-press operation in the second display region is implemented, a long-press operation acting on the second display region is determined as the second selection operation. That is, it is determined that the second selection operation is received in this case, and the second multimedia data carried in the second multimedia message is obtained.

When the second multimedia data synthesized with the first multimedia data in the first multimedia message is multimedia data carried in a multimedia message received by another session window, or locally stored multimedia data, the first selection operation is a long-press operation by a user. In this case, a plurality of operation options of the first multimedia message are displayed. After an operation option of video splicing is selected, a multimedia data selection interface is displayed, a second selection operation is received through the multimedia data selection interface, and the second multimedia data is determined.

Step S104. Present a synthesis interface in response to a multimedia synthesis instruction.

The multimedia synthesis instruction may be triggered by determining that a completion condition of the first selection operation is reached, and may further be triggered by selecting the second multimedia data. The synthesis interface may be presented above the session interface in the form of a floating layer, and a size of the synthesis interface may be smaller than or equal to a size of the session interface. For example, the synthesis interface may be presented in a lower half of the session interface. The synthesis interface presents the first multimedia data and the second multimedia data carried in the first multimedia message. If the multimedia data is image data, a thumbnail of the image data is presented in the synthesis interface. If the multimedia data is video data, then, a cover thumbnail of the video data is presented in the synthesis interface.

Step S105. Perform synthesis processing on the first multimedia data and the second multimedia data to obtain synthesized multimedia data.

Step S105 may be implemented in the following manner. When both the first multimedia data and the second multimedia data are video data, then, splicing and synthesis may be directly performed, and a splicing order is that splicing is performed according to an arrangement order in the synthesis interface; and when the first multimedia data and the second multimedia data include image data, video data is first generated from the image data, and then, splicing is performed based on the arrangement order in the synthesis interface, so as to obtain the synthesized multimedia data. That is, the synthesized multimedia data is video data.

In some embodiments, after the synthesized multimedia data is obtained, the synthesized multimedia data may be locally saved, forwarded, published on social platforms, or the like, so as to implement the content deposition or storage of the spliced long video.

In the multimedia data processing method provided in this embodiment of this application, when multimedia data carried in the multimedia message needs to be synthesized after receiving the multimedia message or transmitting the multimedia message through a session application, first, the first selection operation triggered by the session interface is received, and the first multimedia message corresponding to the first selection operation is determined, and then, the second multimedia data is determined based on the received second selection operation. The second multimedia data may be multimedia data carried in other multimedia messages, and may also be locally stored multimedia data. The diversity of the multimedia data types (e.g., image, video, voice, or audio data, etc.) may be improved, and synthesis processing is performed on the first multimedia data and the second multimedia data to obtain the synthesized multimedia data in response to the multimedia synthesis instruction; and in this way, receiving and editing of the multimedia data are both completed in the session interface, and there is no need to switch to other software, which may not only reduce the processing difficulty in merging videos, but also ensure the continuity of operations, thereby improving efficiency.

In some embodiments, when the first selection operation is a long-press and drag operation, after step S102, the method further includes:

Obtain a first cover image of the first multimedia message in response to detecting that the first selection operation acts on a first display region of the first multimedia message.

When the first multimedia data carried in the first multimedia message is video data, the first cover image of the first multimedia message may be a first video frame image in the first multimedia data. In some embodiments, the first cover image may be a thumbnail of the first video frame image.

Control the first cover image to be displayed in a manner of a floating layer.

Control the first cover image to be displayed in a manner of a floating layer may be implemented in the following manner. The first cover image is controlled to be displayed in the form of a floating layer according to a preset transparency. For example, the transparency may be 15%, 20%, 25%, etc. Therefore, the content in the session interface may be displayed through the first cover image, so as to determine whether the correct second multimedia message is selected.

Control the first cover image to move with the first selection operation in response to detecting that the first selection operation triggers a movement instruction.

When the first selection operation by a user comprises a long-press and drag operation, in response to detecting that an action point of the first selection operation moves, it is determined that a movement instruction is triggered, and the first cover image is controlled to move with the first selection operation. As an example, it may be to control the first cover image to move with the action point of the first selection operation.

In this embodiment of this application, when the first multimedia message is selected and the first multimedia data in the first multimedia message needs to be synthesized with the multimedia data in other multimedia messages in the current session interface, by moving the action point of the first selection operation, the first cover image of the first multimedia data may be driven to move with the action point, so as to search for the second multimedia message.

Step S103 "determine the second multimedia data in response to the second selection operation" shown in FIG. 4 may be implemented by the following steps:

Determine that the second selection operation is received in response to detecting that the first selection operation acts on a second display region of a second multimedia message.

Determine multimedia data carried in the second multimedia message as the second multimedia data.

That is, in response to detecting that the action point of the first selection operation reaches the second display region of the second multimedia message, it is determined that the second selection operation is received in this case. That is, it is considered that the second multimedia data carried in the second multimedia message is selected in this case. In some embodiments, it may also be that in response to detecting that the action point of the first selection operation reaches the second display region of the second multimedia message and acts on the second display region for a specific period of time, it is determined that the second selection operation is received in this case.

In some embodiments, in response to detecting that the first selection operation acts on a second display region of a second multimedia message, the following steps may further be performed:

Update the second display region to a selected state.

As an example, updating the second display region to the selected state may be to display an edge of the second display region with a highlighted color line, for example, may be to display with a red line and a yellow line. In some embodiments, it may further be to display the edge of the second display region with a highlighted color line, and to flash a preset quantity of times.

Present a prompt message that the first multimedia data is to be synthesized with the second multimedia data.

Figure 8A:
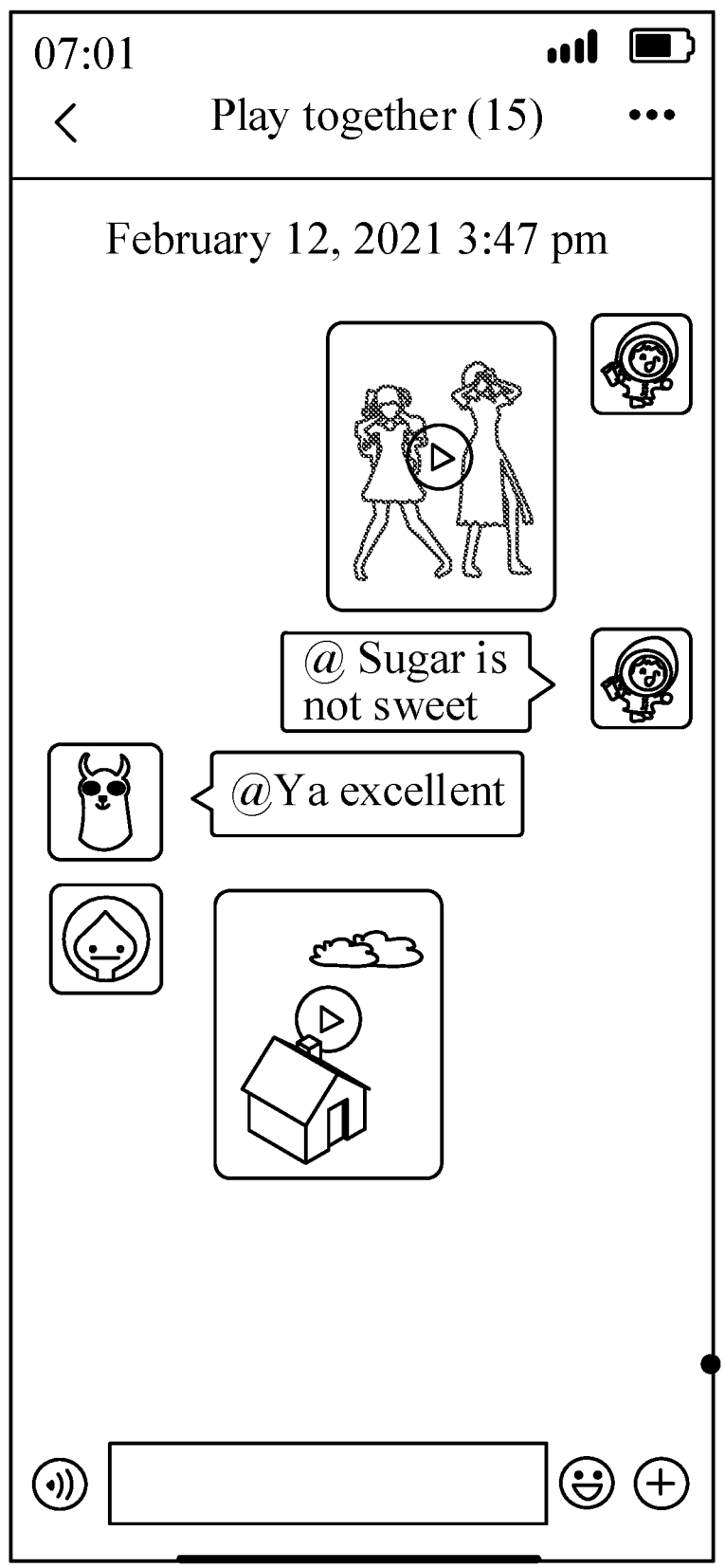
FIG. 8A is a schematic diagram of a session interface according to an embodiment of this application.
Figure 8B:
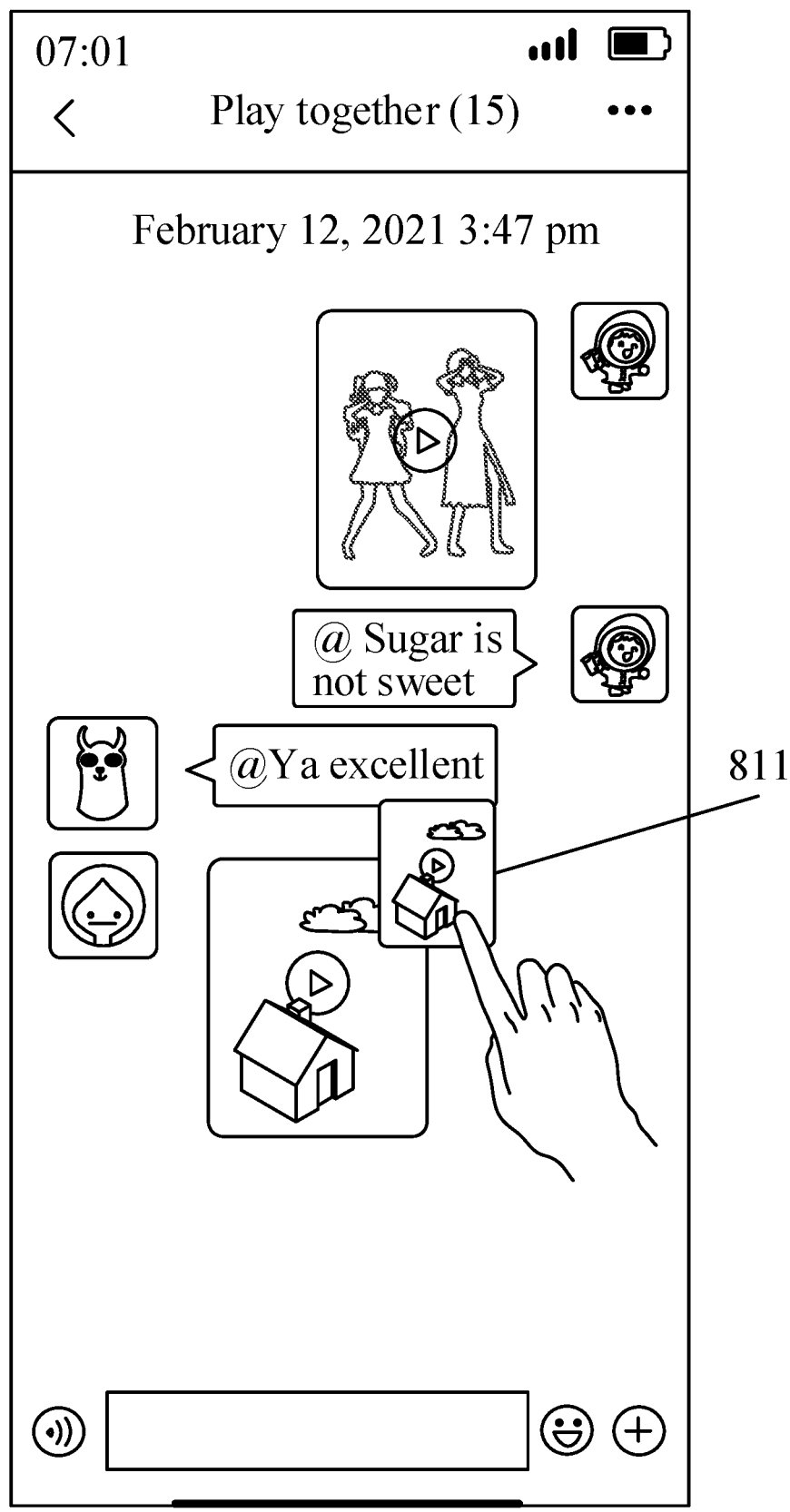
FIG. 8B is a schematic diagram of an interface for long-pressing a video card region to display a thumbnail according to an embodiment of this application.
Figure 8C:
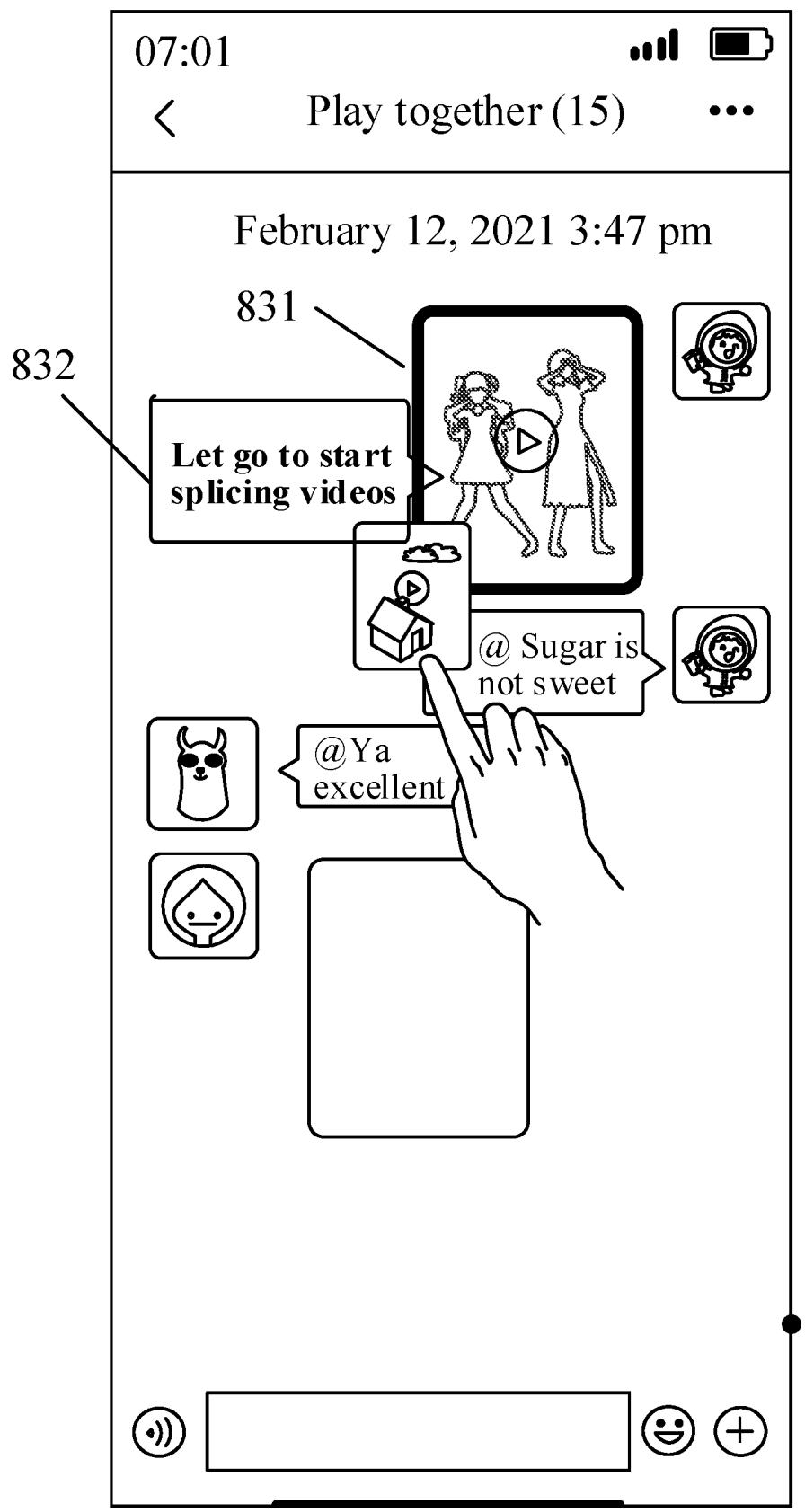
FIG. 8C is a schematic diagram of an interface for dragging a video card to another video card according to an embodiment of this application.

As an example, the prompt message may be presented in the form of message bubbles. For example, as shown in FIG. 8C, a prompt message bubble 832 of "Let go to start splicing videos" is presented.

After selecting the first multimedia message through the first selection operation, and dragging the first cover image corresponding to the first multimedia message until the action point of the first selection operation reaches the second display region of the second multimedia message, the second multimedia message is selected to determine in an implementation scenario of the first multimedia data to be spliced and the second multimedia data to be spliced, the multimedia synthesis instruction may be triggered by determining that a completion condition of the first selection operation is reached. The completion condition of the first selection operation is reached, which may refer to completing the first selection operation. For example, in response to detecting that an acting body of the first selection operation (for example, a finger, a stylus, or the like) no longer acts on the terminal, it is considered that the completion condition of the first selection operation is reached. In this case, the second action point of the first selection operation is a termination action point of the first selection operation.

In some embodiments, in response to detecting that the first selection operation does not act on other multimedia messages except the first multimedia message and detecting that the first selection operation ends, in this case, it is determined that an operation instruction for canceling multimedia splicing is received, and the first cover image displayed in a manner of a floating layer is canceled.

In some embodiments, when the second multimedia data synthesized with the first multimedia data in the first multimedia message is multimedia data carried in a multimedia message received by another session interface, or locally stored multimedia data, the method further includes:

Present, in response to the first selection operation, an operation option interface for the first multimedia message.

Figure 5:
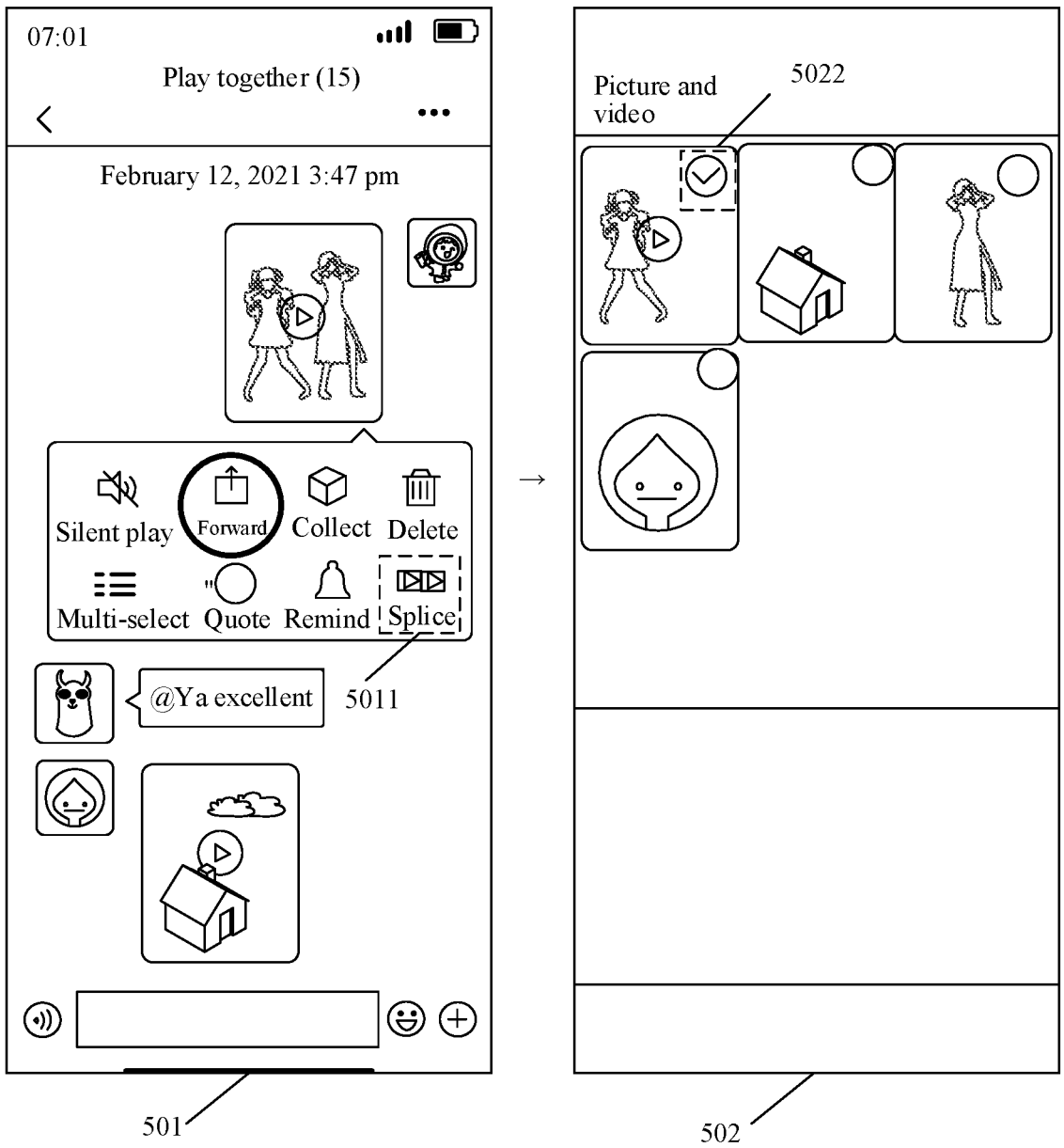
FIG. 5 is a schematic flowchart of another implementation of a multimedia data processing method according to an embodiment of this application.

The operation option interface at least includes a multimedia splicing control. FIG. 5 is a schematic diagram of an operation option interface according to an embodiment of this application. As shown in FIG. 5, after receiving the first selection operation in the form of a long press, an operation option interface 501 is presented. The operation option interface 501 presents operation controls such as forwarding, collecting, and deleting, and further presents a multimedia splicing control 502.

Present, in response to a trigger operation for the multimedia splicing control, a multimedia data selection interface.

The multimedia data selection interface presents a plurality of pieces of selectable multimedia data. The plurality of pieces of selectable multimedia data may be multimedia data carried in a multimedia message transmitted by another session window, and may further be locally stored multimedia data.

Receive the second selection operation through the multimedia data selection interface.

In this embodiment of this application, each piece of selectable multimedia data respectively corresponds to a selection control, and a second selection operation for the multimedia data may be received through the selection control. When the selection control is updated to the selected state, it is determined that the multimedia data is selected.

The multimedia data that is synthesized with the first multimedia data carried in the first multimedia message in the current session interface may be selected from another session interface or locally stored multimedia data, thereby improving the flexibility and diversity of multimedia data splicing.

In some embodiments, as shown in step S105 "Perform synthesis processing on the first multimedia data and the second multimedia data to obtain synthesized multimedia data" in FIG. 4, there are several different implementations based on data types of the first multimedia data and the second multimedia data:

when both the first multimedia data and the second multimedia data are video data, step S105 may be implemented in the following manner. Splicing is directly performed on the first multimedia data and the second multimedia data to obtain the synthesized multimedia data.

As an example, splicing is directly performed on the first multimedia data and the second multimedia data, which may be performing splicing based on an arrangement order of the first multimedia data and the second multimedia data in the synthesis interface. For example, when the first multimedia data is before the second multimedia data, then, when playing the synthesized multimedia data, the first multimedia data is played first, and the second multimedia data is then played.

When both the first multimedia data and the second multimedia data are image data, step S105 may be implemented by the following steps:

Generate first video data based on the first multimedia data, and generate second video data based on the second multimedia data.

First video data is generated based on the first multimedia data. As an example, the first multimedia data may be determined as a video frame of a video track, and the first video data of a preset duration is generated according to a preset frame rate. Video frames of the first video data may all be the first multimedia data. For example, the first video data of 3 seconds may be generated from the first multimedia data.

In some embodiments, first video data is generated based on the first multimedia data. As an example, the first multimedia data may further be determined as a video frame of a video track, and then, the first video data of a preset duration is generated according to the preset frame rate and transition effect.

An implementation process of generating the second video data based on the second multimedia data is similar to a process of generating the first video data.

Perform splicing on the first video data and the second video data to obtain the synthesized multimedia data.

Splicing is performed on the first video data and the second video data, which may be performing splicing based on the arrangement order of the first multimedia data and the second multimedia data in the synthesis interface, so as to obtain the synthesized multimedia data.

When the first multimedia data is image data and the second multimedia data is video data, step S105 may be implemented by the following steps:

Generate first video data based on the first multimedia data.

Perform splicing on the first video data and the second multimedia data to obtain the synthesized multimedia data.

When the first multimedia data is video data and the second multimedia data is image data, step S105 may be implemented by the following steps:

Generate second video data based on the second multimedia data.

Perform splicing on the first multimedia data and the second video data to obtain the synthesized multimedia data.

The implementation processes when the first multimedia data is image data and the second multimedia data is video data and when the first multimedia data is video data and the second multimedia data is image data are similar to the corresponding implementation processes when both the first multimedia data and the second multimedia data are image data.

The first multimedia data and/or the second multimedia data may further be voice data. The voice data may be voice data carried in the voice message in the session interface, may further be the voice data stored locally by the terminal, and may further be the voice data after converting a text message in the session interface into a voice message.

When both the first multimedia data and the second multimedia data are voice data, step S105 may be implemented in the following manner. Splicing is directly performed on the first multimedia data and the second multimedia data to obtain the synthesized multimedia data. If a playback duration of the first multimedia data is 15 seconds and a playback duration of the second multimedia data is 25 seconds, then, a playback duration of the synthesized multimedia data is 40 seconds.

When the first multimedia data is voice data and the second multimedia data is image data, step S105 may be implemented by the following steps:

Generate the third video data from the second multimedia data based on a playback duration of the first multimedia data.

As an example, a playback duration of the generated third video data may be equal to the playback duration of the first multimedia data. Therefore, the second multimedia data may be determined as a video frame image of a video track, and the third video data of the playback duration may be generated according to a preset frame rate. For example, if the playback duration of the first multimedia data is 15 seconds, then, the third video data of 15 seconds is generated from the image data in the second multimedia data. The third video data may not include voice data.

Perform synthesis processing on the first multimedia data and the third video data to obtain the synthesized multimedia data.

Because the first multimedia data is voice data, as an example, the first multimedia data may be used as background voice data of the third video data. That is, the first multimedia data and the third video data are respectively copied to two tracks (audio track and video track) aligned with the same time axis, and the two tracks are synthesized. Therefore, when the synthesized multimedia data is played, the first multimedia data (voice data) is played when the third video data is simultaneously played.

When the first multimedia data is image data and the second multimedia data is voice data, an implementation process of step S105 is similar to implementation processes when the first multimedia data is voice data and the second multimedia data is image data. Based on the playback duration of the second multimedia data, the first multimedia data is generated from fifth video data, and the fifth video data is synthesized with the second multimedia data to obtain the synthesized multimedia data. That is, when one piece of the to-be-synthesized multimedia data is image data and the other is voice data, video data is generated from the image data based on the playback duration of the voice data, and then, the video data is synthesized with the voice data.

When the first multimedia data is voice data, and the second multimedia data is video data, step S105 may be implemented by the following steps:

Perform muting processing on the second multimedia data to obtain processed second multimedia data.

Muting processing is performed on the second multimedia data, that is, audio data in the second multimedia data is deleted. When playing the processed second multimedia data, only each video frame image in the second multimedia data is played, and sound is not played.

Perform synthesis processing on the first multimedia data and the processed second multimedia data to obtain the synthesized multimedia data.

may be implemented in the following manner. First, the first playback duration of the first multimedia data and the second playback duration of the second multimedia data are obtained. Based on the first playback duration and the second playback duration, at least one piece of to-be-adjusted multimedia data is determined from the first multimedia data and the second multimedia data, and a reference duration is determined. Then, based on the first playback duration, the second playback duration, and the reference duration, the multi-speed adjustment is performed on the to-be-adjusted multimedia data to obtain the adjusted multimedia data. Then, synthesis processing is performed on the adjusted multimedia data and the unadjusted multimedia data to obtain the synthesized multimedia data. The playback duration of the synthesized multimedia data is the reference duration, and when the synthesized multimedia data is played, voice data and video data are simultaneously played. That is, the synthesis processing in this case is not splicing, but is fusion processing.

Based on the first playback duration and the second playback duration, at least one piece of to-be-adjusted multimedia data is determined from the first multimedia data and the second multimedia data, and the reference duration is determined, which may be implemented in the following manner: duration difference information of the first playback duration and the second playback duration is determined, and when the duration difference information is less than or equal to a difference threshold, one of the first playback duration and the second playback duration is used as the reference duration. Then, the playback rate of the multimedia data that is not used as the reference duration is adjusted, and the adjusted playback duration of the multimedia data is the reference duration. As an example, the total quantity of video frames included in the multimedia data that is not used as a reference duration may be determined first. Then, the total quantity of video frames is divided by the reference duration to obtain the reference playback rate. The reference playback rate is determined as the playback rate of the multimedia data that is not used as the reference duration, so that the adjusted playback duration of the multimedia data is the reference duration.

Duration difference information may be the directly calculated duration difference, and may further be the percentage of the calculated duration difference and the relatively short playback duration. Determining whether the duration difference information is less than the difference threshold may be to determine whether the duration difference is less than a first difference threshold, and/or to determine whether the duration difference percentage is less than a first difference percentage threshold.

For example, the first playback duration is 20 seconds, the second playback duration is 25 seconds, the duration difference is 5 seconds, and the percentage of the duration difference is 25%. Determining whether the duration difference information is less than the difference threshold may be to determine whether the duration difference is less than 10 seconds. Because the duration difference is 5 seconds, which is less than 10 seconds, one of the first playback duration and the second playback duration is used as the reference duration. For example, if the first playback duration is determined as the reference duration, then, multi-speed adjustment is performed on the second multimedia data, so that the second multimedia data is played within 20 seconds, thereby obtaining the adjusted second multimedia data. Then, synthesis processing is performed on the first multimedia data with the same playback duration and the adjusted second multimedia data to obtain the synthesized multimedia data.

In some embodiments, when the duration difference information is greater than the difference threshold, it indicates that a difference between the first playback duration and the second playback duration is relatively great. In this case, a mean value of the first playback duration and the second playback duration may be determined as the reference duration, and then, multi-speed adjustment is performed on the first multimedia data and the second multimedia data based on the reference duration. Both the adjusted playback duration of the first multimedia data and the adjusted playback duration of the second multimedia data are reference durations. Then, synthesis processing is performed on the adjusted first multimedia data and the adjusted second multimedia data to obtain the synthesized multimedia data.

When the first multimedia data is video data and the second multimedia data is voice data, an implementation process of step S105 is similar to implementation processes of step S1051ED and step S1052E. Muting processing is performed on the first multimedia data, and based on the first playback duration of the first multimedia data and the second playback duration of the second multimedia data, multi-speed adjustment is performed on the first multimedia data and/or the second multimedia data to obtain the adjusted first multimedia data and/or the adjusted second multimedia data, and finally synthesis processing is performed. That is, when one piece of the to-be-synthesized multimedia data is voice data and the other is video data, muting processing is performed on the video, then, multi-speed adjustment is performed, and finally, synthesis processing is performed.

In the foregoing embodiment, when the first multimedia data and the second multimedia data are image data, video data, and voice data, there are different implementations. When at least one piece of the first multimedia data and the second multimedia data is image data, video data is generated from the image data, and then, video splicing is performed to obtain a spliced long video of a video type, which may implement the splicing of various types of multimedia data. When there is voice data in the first multimedia data and the second multimedia data, the two pieces of voice data may be directly spliced, and the voice data may further be used as background voice of the video data to perform synthesis processing to obtain the synthesized multimedia data, thereby improving the diversity of splicing.

In some embodiments, after the presenting a synthesis interface, the method further includes:

Receive a third selection operation for multimedia data presented in the synthesis interface.

As an example, the third selection operation may be a long-press operation on a display region in which a specific piece of multimedia data is presented.

Determine target multimedia data corresponding to the third selection operation, and enter a multimedia data sorting state.

The third selection operation acts on the display region of the multimedia data in the synthesis interface, and the multimedia data is the target multimedia data. When entering a multimedia data sorting state, display regions of at least two pieces of multimedia data presented in the synthesis interface may flash to indicate that the multimedia data may be moved.

In some embodiments, after the target multimedia data is determined, a delete control may further be presented at a preset position of the display region of each piece of multimedia data. When a touch operation for a specific delete control is received, multimedia data corresponding to the delete control is deleted.

Determine a sorting result of the multimedia data presented in the synthesis interface in response to a received movement operation of moving the target multimedia data.

Synthesize, based on the sorting result, the multimedia data presented in the synthesis interface to obtain the synthesized multimedia data.

Based on the sorting result, the multimedia data presented in the synthesis interface is synthesized. As an example, the first two pieces of multimedia data may be synthesized to obtain the multimedia data synthesized in the first step. Then, the multimedia data synthesized in the first step is synthesized with the third multimedia data to obtain the multimedia data synthesized in the second step. Synthesis is sequentially performed until all the multimedia data in the synthesis interface are synthesized.

In this embodiment of this application, when both pieces of to-be-synthesized multimedia data are video data, then synthesizing the two pieces of multimedia data refers to performing continuous synthesis based on the time axis of the two pieces of multimedia data; when one piece of the two pieces of to-be-synthesized multimedia data is image data and the other is video data, the image data needs to be converted into video data, and then continuous synthesis is performed based on the time axis of the two pieces of video data; when one piece of the two pieces of to-be-synthesized multimedia data is audio data and the other is image data, video data is generated from the image data according to the playback duration of the audio data, and then, the audio data and video data are synthesized on an audio track and a video track that are aligned on the same time axis; and when one piece of the to-be-synthesized multimedia data is audio data and the other is video data, muting processing is performed on the video data, and then, the video data is synthesized with the audio data on the video track and the audio track that are aligned on the same time axis.

For example, when there are three pieces of multimedia data in the synthesis interface, the first piece is voice data, the second piece is image data, and the third piece is video data according to order. When synthesis is performed, first, the first voice data is synthesized with the second image data, and the obtained synthesized multimedia data is a piece of video data. Then, splicing is performed on the video data synthesized and obtained in the first step and the third video data to obtain the finally synthesized multimedia data.

Through the step S301 to step S304, the plurality of pieces of multimedia data presented in the synthesis interface may be sorted and synthesized based on a sorting result, thereby improving the flexibility of multimedia data splicing.

Figure 6:
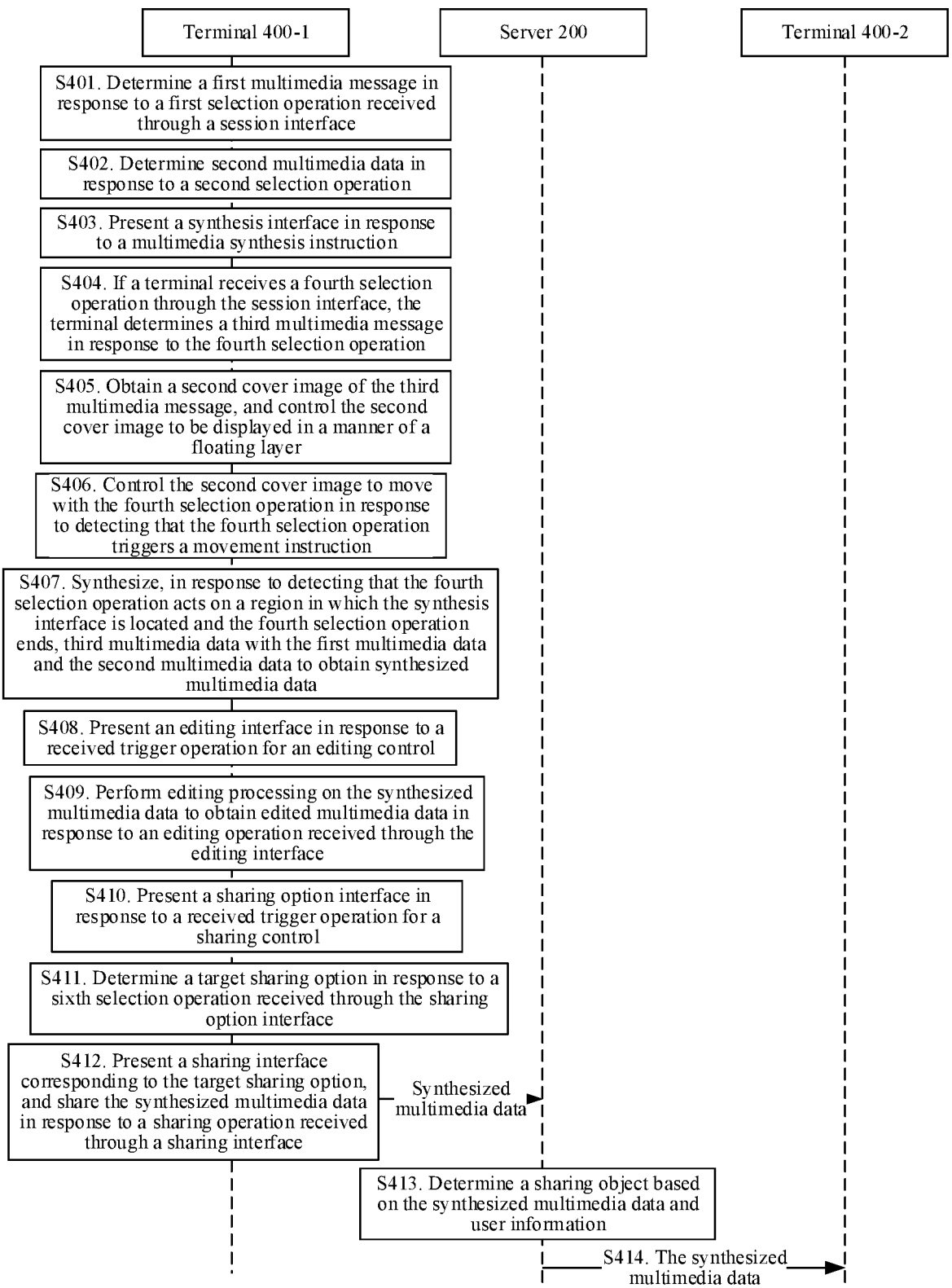
FIG. 6 is a schematic flowchart of still another implementation of a multimedia data processing method according to an embodiment of this application.

Based on the foregoing embodiments, this embodiment of this application further provides a multimedia data processing method, which is applied to the network architecture shown in FIG. 2. FIG. 6 is a schematic flowchart of still another implementation of a multimedia data processing method according to an embodiment of this application. As shown in FIG. 6, the process includes:

Step S401. A terminal determines a first multimedia message in response to a first selection operation received through the session interface.

The first multimedia message carries first multimedia data, and the first multimedia data may be image data, and may also be video data.

Step S402. The terminal determines second multimedia data in response to a second selection operation.

The second multimedia data may be multimedia data carried in another multimedia message in the current session interface, multimedia data in the local storage space of the terminal, or multimedia data carried in a multimedia message in another session window.

Step S403. The terminal presents a synthesis interface in response to a multimedia synthesis instruction.

The synthesis interface presents the first multimedia data and the second multimedia data carried in the first multimedia message. In this embodiment of this application, the synthesis interface further presents an editing control and a sharing control for the multimedia data.

Step S404. If the terminal receives a fourth selection operation through the session interface, the terminal determines a third multimedia message in response to the fourth selection operation.

The fourth selection operation acts on a third display region of the third multimedia message. The fourth selection operation may be a long-press and drag operation.

Step S405. The terminal obtains a second cover image of the third multimedia message, and controls the second cover image to be displayed in the manner of the floating layer.

When the third multimedia message is a video message, the second cover image may be the first video frame image of the third multimedia data carried in the third multimedia message. When the third multimedia message is an image message, the second cover image may be a thumbnail of the image message. The floating layer may have a specific degree of transparency, so that the content in the session interface may be displayed through the floating layer in a process of moving the second cover image.

Step S406. When detecting that the fourth selection operation triggers a movement instruction, the terminal controls the second cover image to move with the fourth selection operation.

Step S407. When detecting that the fourth selection operation acts on a region in which the synthesis interface is located and the fourth selection operation ends, the terminal synthesizes the third multimedia data with the first multimedia data, and the second multimedia data to obtain the synthesized multimedia data.

Through the step S404 to step S407, after the first multimedia data and the second multimedia data are determined, the to-be-synthesized multimedia data may be obtained again from other multimedia messages in the current session interface through the fourth selection operation received in the session interface (as an example, the fourth selection operation may be a long-press and drag operation), and synthesis processing continues to be performed, thereby improving the convenience of video splicing.

Step S408. The terminal presents an editing interface in response to a received trigger operation for the editing control.

The editing interface presents a plurality of editing options, including, but is not limited to: adding text, adding music, adding special effects, adding filters, color correction, cropping, and changing speed.

Step S409. The terminal performs editing processing on the synthesized multimedia data to obtain edited multimedia data in response to an editing operation received through the editing interface.

In this embodiment of this application, the editing operation may be a series of operations, and various editing may be performed on the spliced video, for example, text may be added, and special effects and color correction may be added. As an example, after an editing completion operation is received, the edited multimedia data is obtained.

Step S410. The terminal presents a sharing option interface in response to a received trigger operation for the sharing control.

Figure 10A:
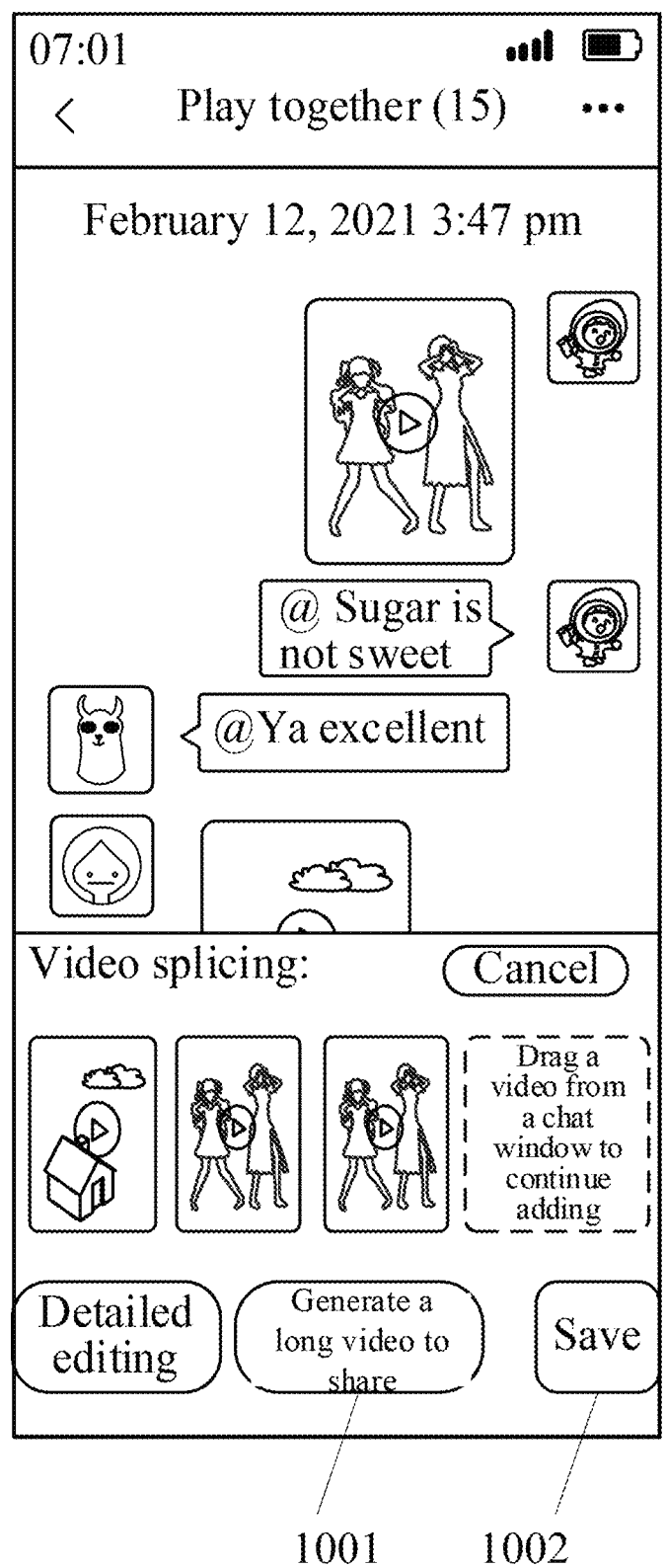
FIG. 10A is a schematic diagram of an interface of a splicing region according to an embodiment of this application.

In this embodiment of this application, the sharing control may be shown as the sharing control 1001 shown in FIG. 10A. After clicking the sharing control 1001, a sharing option interface 1011 may be presented in the interface shown in FIG. 10B. The sharing option interface presents a plurality of sharing options, such as sharing to friends, transmitting to social platforms, or the like.

In some embodiments, as shown in FIG. 10A, a separate saving control 1002 may further be presented in the synthesis interface. When a trigger operation for the saving control is received, the synthesized multimedia data is saved to the local storage space of the terminal.

Figure 10B:
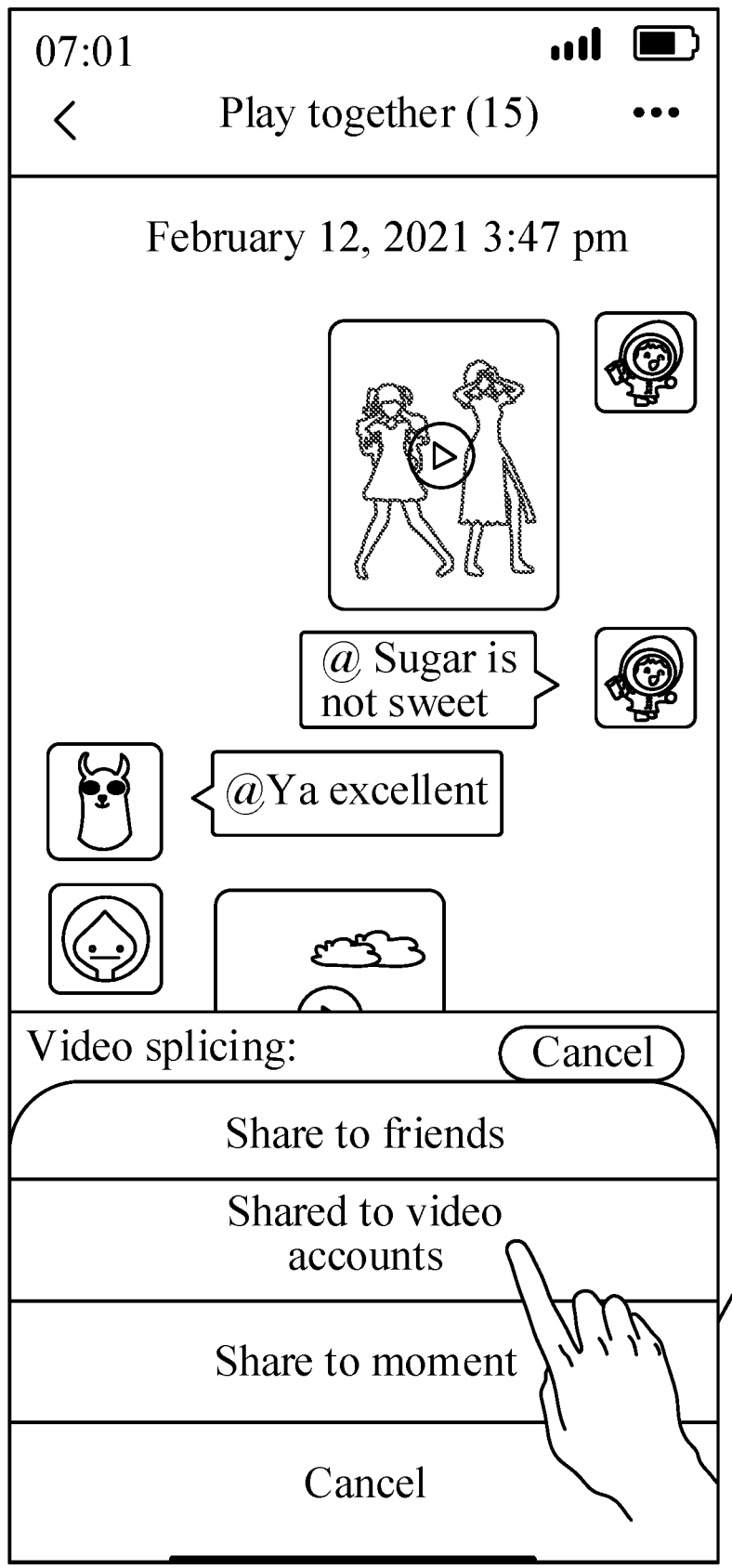
FIG. 10B is a schematic diagram of a sharing option interface according to an embodiment of this application.
Figure 10C:
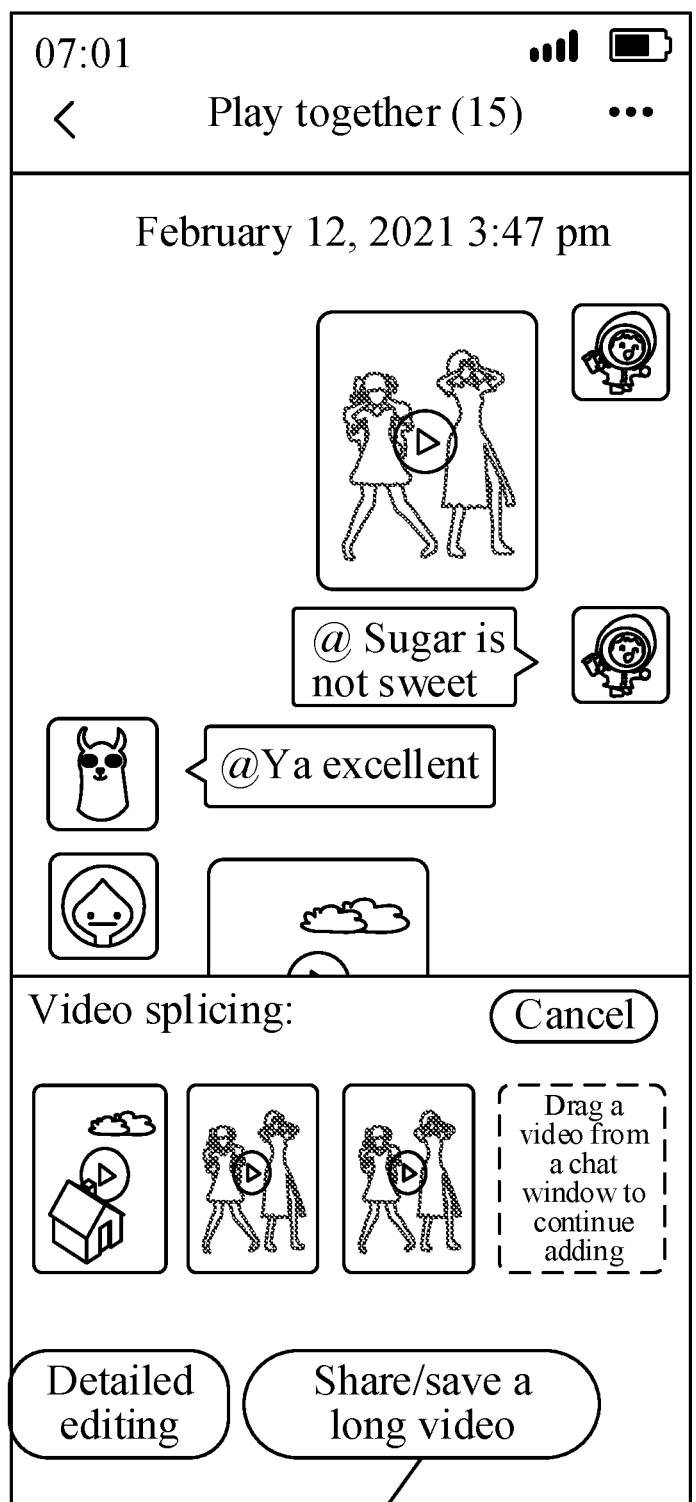
FIG. 10C is a schematic diagram of still another interface of a splicing region according to an embodiment of this application.
Figure 10D:
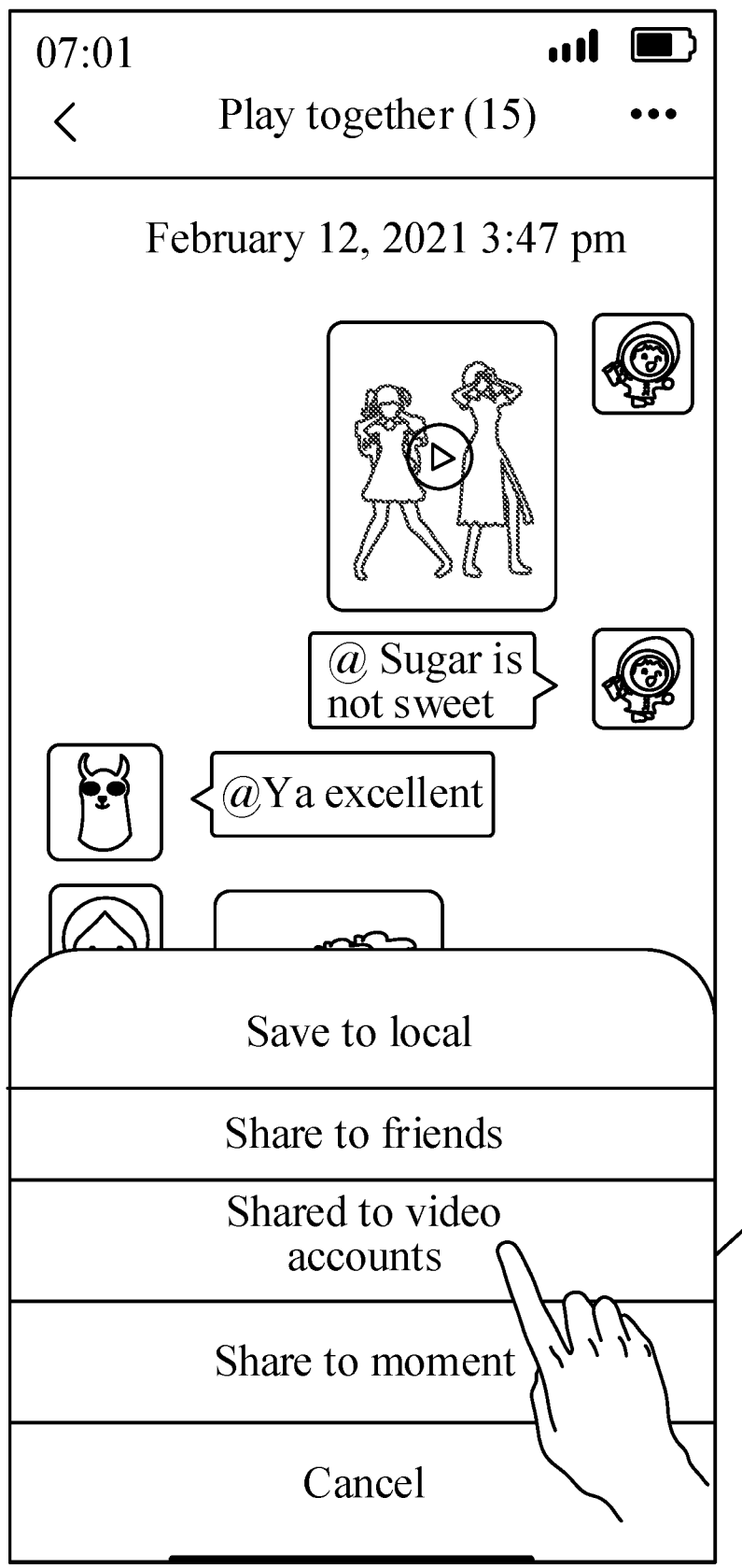
FIG. 10D is a schematic diagram for sharing and saving an option interface according to an embodiment of this application.

In some embodiments, the saving control and the sharing control may be the same control. As described in FIG. 10C, a sharing and saving control 1021 may be presented. When the sharing/saving control 1021 is clicked, the displayed sharing/saving option interface is shown in FIG. 10D. Options included in the option interface 1031 include options such as sharing to friends, sharing to various social platforms, and saving to local.

Step S411. The terminal determines a target sharing option in response to a sixth selection operation received through the sharing option interface.

Step S412. The terminal presents a sharing interface corresponding to the target sharing option, and shares the synthesized multimedia data in response to a sharing operation received through the sharing interface.

In this embodiment of this application, a description is made by using the target sharing option as sharing to a social platform as an example. In this case, step S412 is used as an example, as shown in FIG. 6, the synthesized multimedia data is transmitted to the server.

Step S413. After receiving the synthesized multimedia data, the server determines a sharing object based on the synthesized multimedia data and user information.

Step S414. The server transmits the synthesized multimedia data to the terminal corresponding to the sharing object.

In the multimedia data processing method provided in this embodiment of this application, after receiving the first selection operation triggered by the session interface, the first multimedia message corresponding to the first selection operation is obtained, the second multimedia data is determined in response to the second selection operation, and a synthesis interface is presented in response to the multimedia synthesis instruction. The synthesis interface presents the first multimedia data carried in the first multimedia message and the second multimedia data. If more multimedia messages further need to be continued to be selected from the current session interface to be synthesized, the third multimedia data corresponding to the third multimedia message may be dragged to the synthesis interface through the fourth selection operation. Synthesis processing may be performed on the first multimedia data, the second multimedia data, and the third multimedia data to obtain the synthesized multimedia data. Then, editing processing may further be performed on the synthesized multimedia data through the synthesis interface, such as adding special effects, color correction, adding filters, or the like, so as to improve the aesthetics and diversity of the synthesized multimedia data. After editing performed on the synthesized multimedia data is completed, the edited multimedia data may further be transmitted to other friends or shared on a social platform, so that precipitation of content of the spliced and edited multimedia data is implemented.

In some embodiments, the synthesis interface further presents an adding control for continuing to add multimedia data. When another session window or locally stored multimedia data needs to be added, the step S404 to step S407 may not be performed, but the following steps may be performed:

If a trigger operation for the adding control is received, present the multimedia data selection interface in response to the trigger operation.

The multimedia data selection interface presents a plurality of pieces of selectable multimedia data, and the plurality of pieces of selectable multimedia data may be multimedia data carried in multimedia messages transmitted or received by other session interfaces, and may further be locally stored multimedia data.

Receive a fifth selection operation for the multimedia data through the multimedia data selection interface, and determine selected fourth multimedia data.

In this embodiment of this application, each piece of selectable multimedia data respectively corresponds to a selection control, and a fifth selection operation for the multimedia data may be received through the selection control. When the selection control is updated to the selected state, it is determined that the multimedia data is selected.

Synthesize the fourth multimedia data with the first multimedia data and the second multimedia data to obtain the synthesized multimedia data.

As an example, synthesis may be performed based on a sorting order of the first multimedia data, the second multimedia data, and the fourth multimedia data in the synthesis interface to obtain the synthesized multimedia data.

In an actual implementation process, after the fourth multimedia data is added to the synthesis interface, an adding control for continuing to add the multimedia data is still displayed in the synthesis interface, and in this case, the multimedia data may be continued to be added.

The following describes an exemplary application of this embodiment of this application in an actual application scenario.

Figure 7:
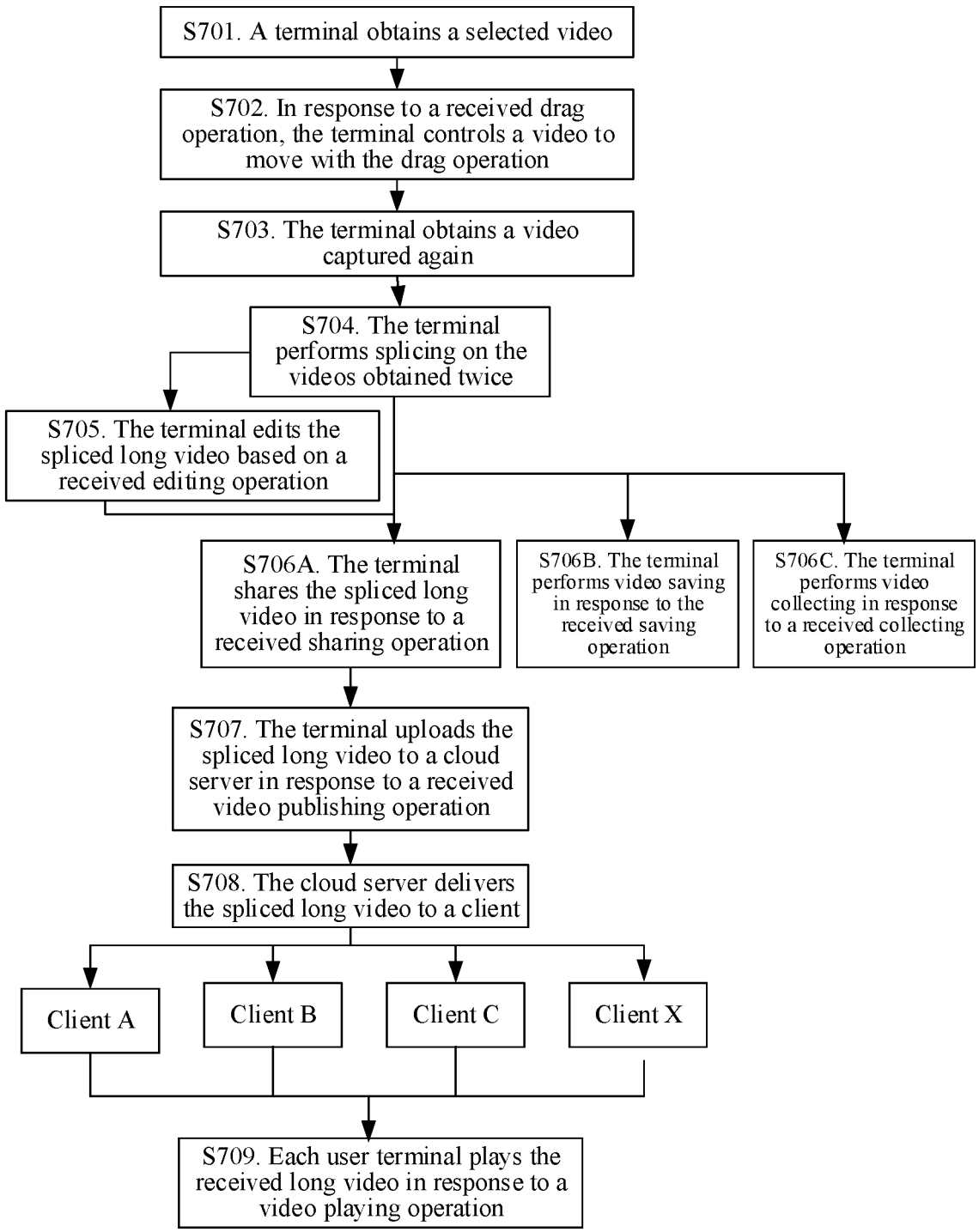
FIG. 7 is a schematic flowchart of still another implementation of a multimedia data processing method according to an embodiment of this application.

FIG. 7 is a schematic flowchart of still another implementation of a multimedia data processing method according to an embodiment of this application. As shown in FIG. 7, the process includes:

Step S701. The terminal obtains a selected video.

As an example, a finger clicking the session interface is identified. When finger touch point coordinates are in a video card region, a corresponding UI changes on the video card. For example, in the session interface shown in FIG. 8A, in response to determining that the finger touch coordinates are in the video card region, as shown in FIG. 8B, a video card thumbnail 811 is copied, and the thumbnail 811 is suspended above the page.

Step S702. In response to the received drag operation, the terminal controls the video to move with the drag operation.

As an example, after monitoring the long-press operation in the video card region, it is determined that an operation of dragging the video is received. Then, a change of a long-press gesture and a position of the long-press gesture are monitored in real time. In a process of long-pressing and dragging, a gesture touch point changes on an x axis and a y axis. As the gesture touch point coordinates (x,y) change, the video card moves with the touch point coordinates of the gesture and presents the corresponding UI changes.

Step S703. The terminal obtains the video captured again.

In a process of long pressing and dragging, in response to detecting that the gesture contact point coordinates (x,y) are in another video card region, the UI interface shown in FIG. 8C is presented in this case. In this case, an edge of the video card 831 is highlighted, indicating that the capture succeeds, and a bubble prompt 832 "Let go to start video splicing" is displayed.

Step S704. The terminal performs splicing on the videos obtained twice.

Figure 8D:
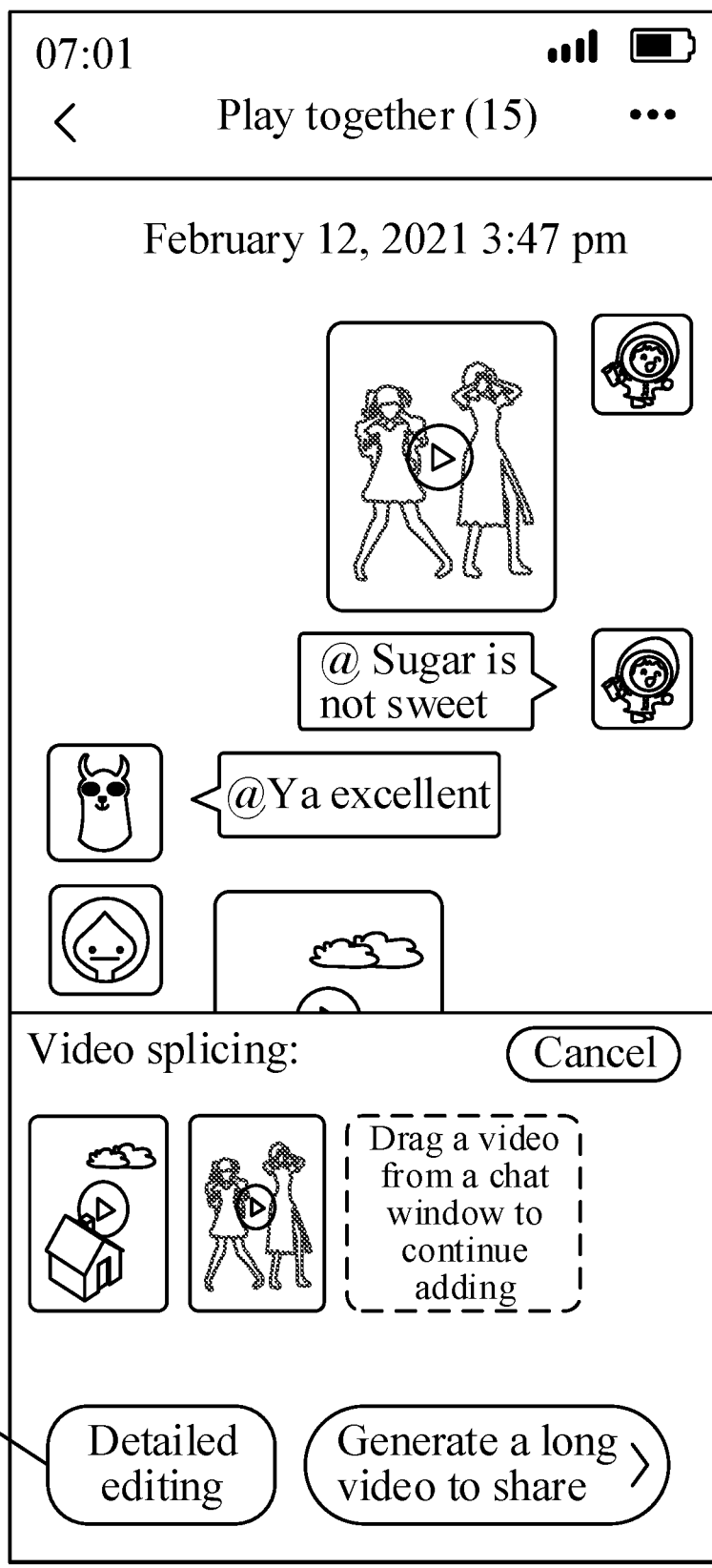
FIG. 8D is a schematic diagram of an interface for displaying a splicing region according to an embodiment of this application.

When the user lets go, the long-press operation being canceled is monitored, and the video splicing starts. In this case, the UI interface shown in FIG. 8D is presented. As shown in FIG. 8D, a splicing region 841 is presented in the display interface, and a video needing to be spliced is presented in the splicing region 841, and a video that is first dragged is the first video by default.

Figure 9A:
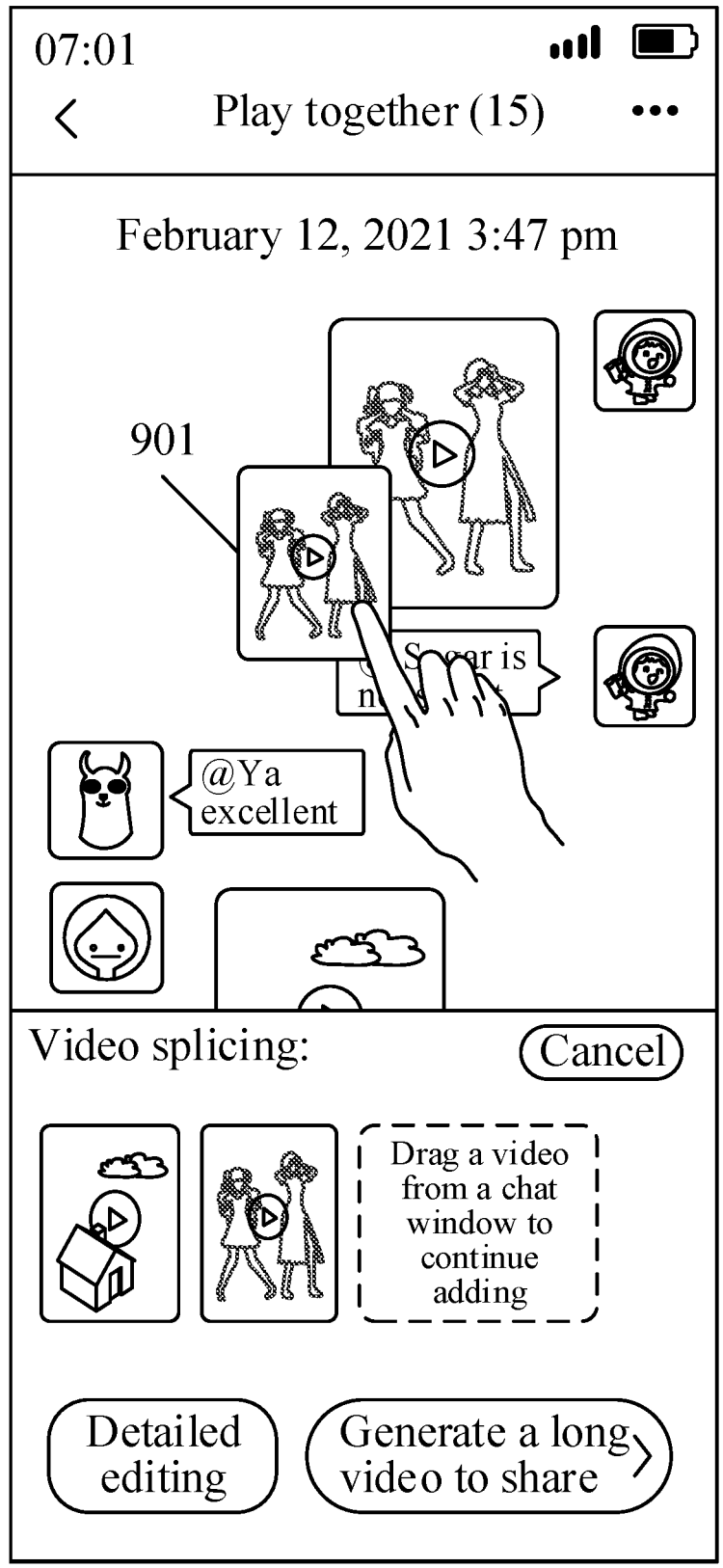
FIG. 9A is a schematic diagram of an interface for selecting a video to continue splicing from a session interface according to an embodiment of this application.
Figure 9B:
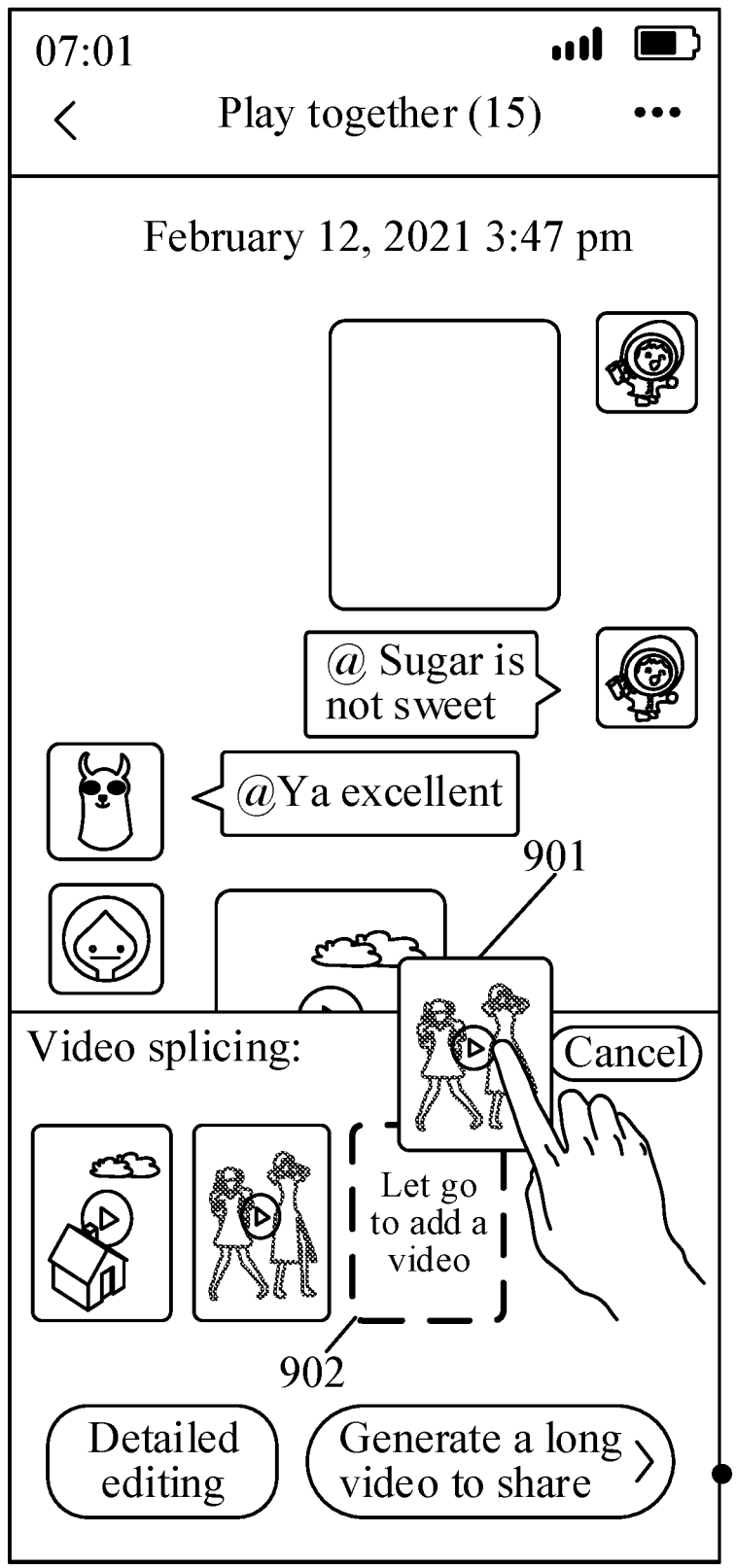
FIG. 9B is a schematic diagram of yet another interface for selecting a video to continue splicing from a session interface according to an embodiment of this application.
Figure 9C:
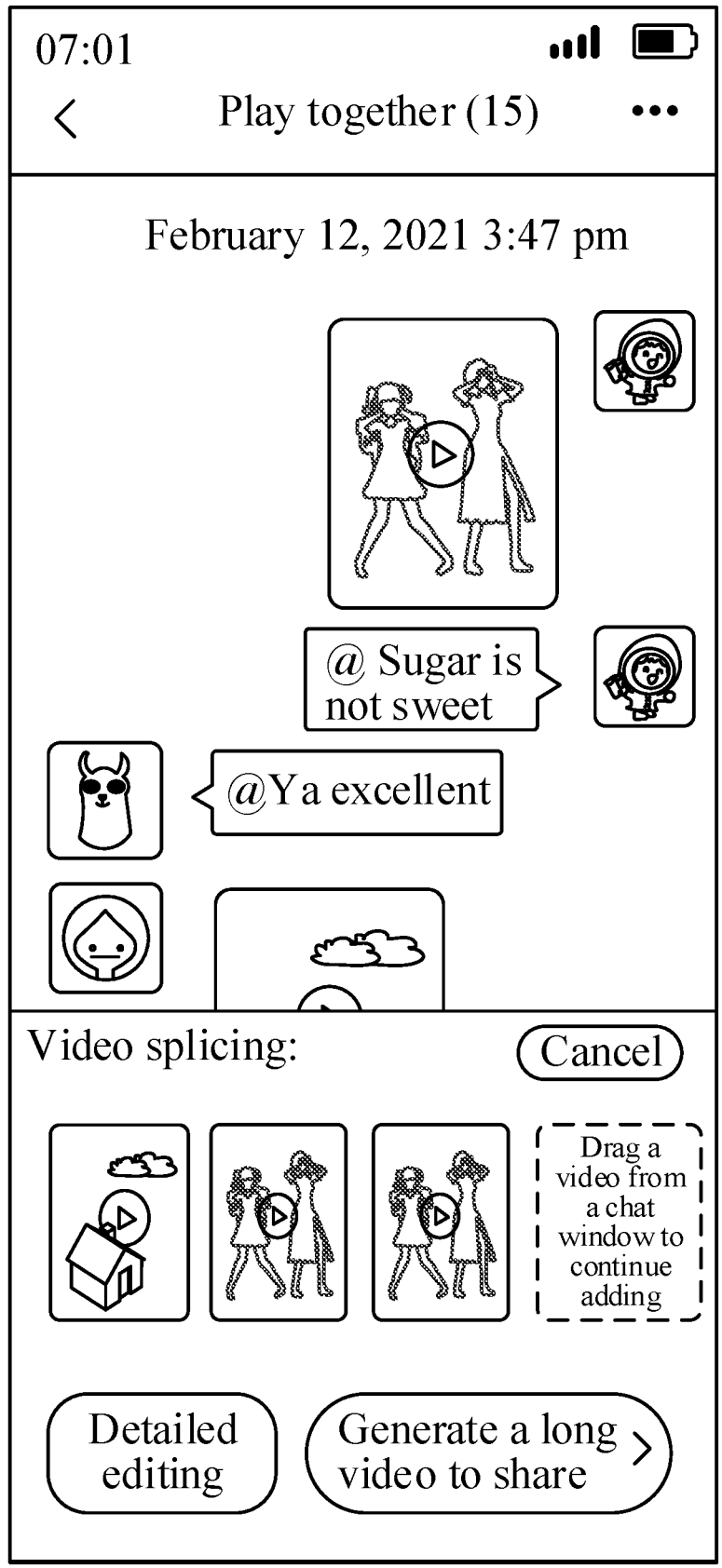
FIG. 9C is a schematic diagram of another interface for selecting a video from a session interface to continue splicing according to an embodiment in the community.

In an actual implementation process, as shown in FIG. 9A, a video 901 in a chat window may be dragged to the splicing region again, and splicing continues to be performed in this case. As shown in FIG. 9B, after the video 901 is dragged into the splicing region, a dashed-line box 902 in the splicing region is in a selected state. After monitoring that the long-press operation is canceled, as shown in FIG. 9C, the video 901 is displayed in the splicing region to be perform splicing, and a dashed-line box is displayed in the splicing region again in this case.

In addition, when clicking the dashed-line box in the splicing region, a video and/or picture selection interface may be presented, and in this case, a video and/or picture transmitted in another chat window may be selected, and locally stored videos and/or pictures may further be selected.

Step S705. The terminal edits the spliced long video based on the received editing operation.

Figure 8E:
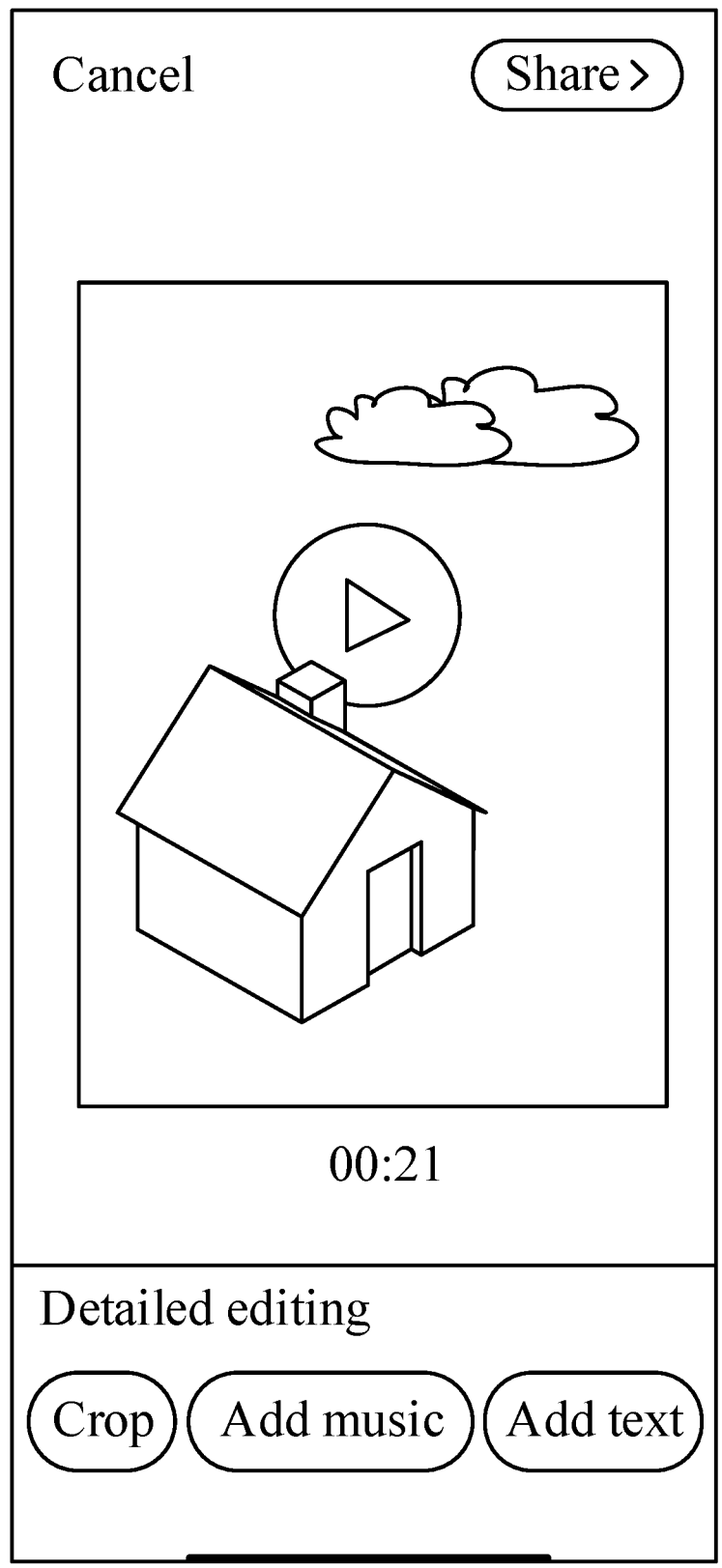
FIG. 8E is a schematic diagram of an editing interface according to an embodiment of this application.

In the display interface shown in FIG. 8D, a "detailed editing" control 8411 is provided, and when the "detailed editing" control is clicked, the editing interface shown in FIG. 8E may be presented. Through the editing interface, editing operations such as cropping, adding special effects, adding music, and adding text may be performed on the spliced video.

In this embodiment of this application, after step S705, one or more of step S706A, step S706B, and step S706C may be performed on a long video obtained by performing splicing.

Step S706A. The terminal shares the spliced long video in response to the received sharing operation.

As shown in FIG. 10A, an operation control 1001 of "Generate a long video to share" is displayed in the splicing region. When the operation control 1001 is clicked, as shown in FIG. 10B, a sharing option interface 1011 is displayed, and the sharing option interface includes a plurality of sharing options, such as sharing to a social platform, sharing to a friend, or sharing to a video account.

In this embodiment of this application, after step S706A, step S707 to step S709 are performed, that is, after the user successfully shares, the spliced long video is uploaded to the cloud, and then distributed to different clients for playing, and a duration of the long video is displayed.

Step S706B. The terminal performs video saving in response to the received saving operation.

Step S706C. The terminal performs video collecting in response to the received collecting operation.

Step S707. The terminal uploads the spliced long video to a cloud server in response to the received video publishing operation.

Step S708. The cloud server delivers the spliced long video to a client.

As shown in FIG. 7, the cloud server delivers the spliced long video to a client A, a client B, a client C, and a client X.

Step S709. Each user terminal plays the received long video in response to a video playing operation.

Figure 11:
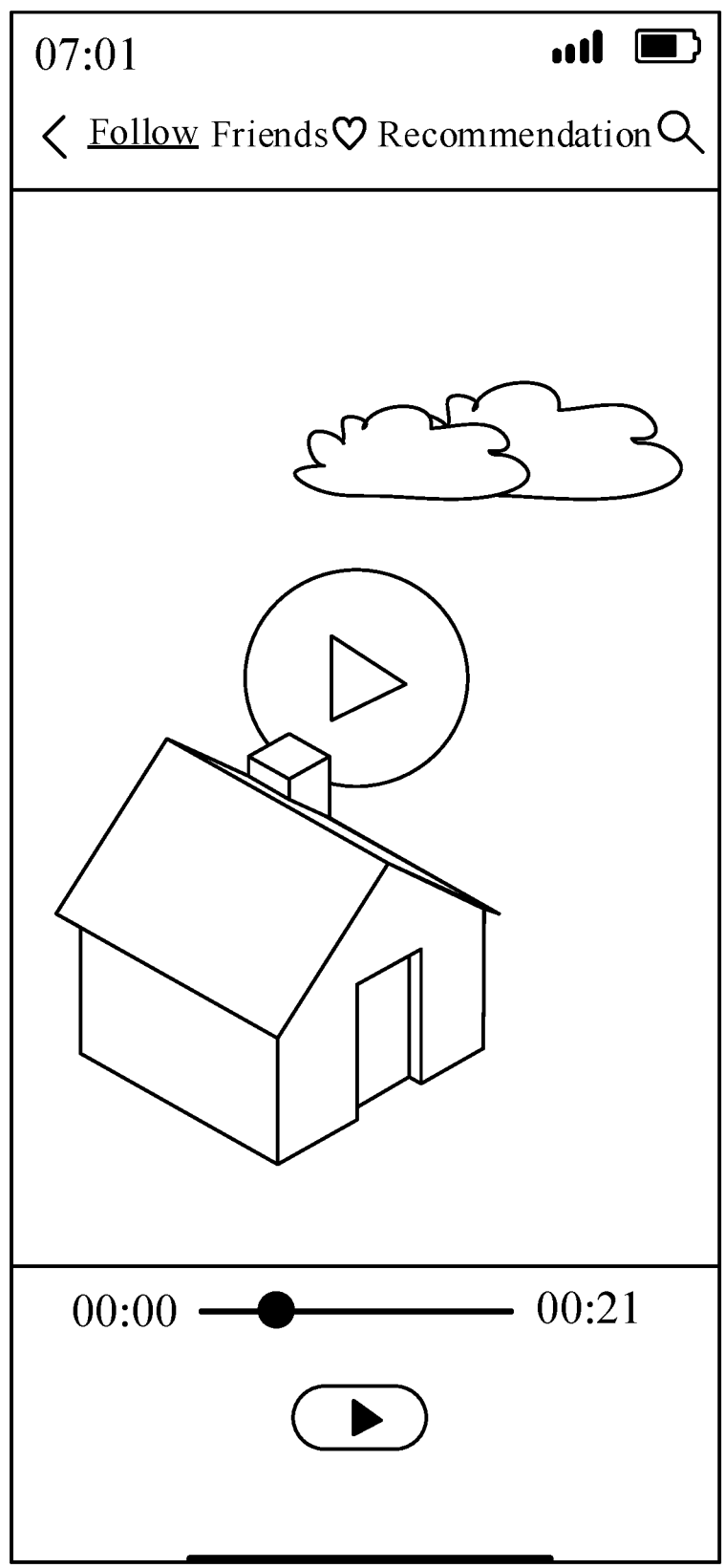
FIG. 11 is a schematic diagram of an interface for playing a spliced video according to an embodiment of this application.

FIG. 11 is a schematic diagram of an interface for playing a long video on a client according to an embodiment of this application. As shown in FIG. 11, after performing splicing on a video with a duration of 15 seconds and a duration of 6 seconds, a video with a duration of 21 seconds is obtained.

In this embodiment of this application, using a splicing object as a video as an example, in an actual implementation process, the splicing object may further be a picture, and the splicing object is not limited to the content in the chat window, but may be a locally uploaded picture or video.

In the multimedia data processing method provided in this embodiment of this application, with reference to a gesture operation, in the chat window, videos may be spliced into a long video in an interaction manner of dragging, and the spliced long video may be forwarded to friends, shared to video accounts and social platforms, or saved locally to be precipitated, to meet the needs of the user to precipitate video content. The convenient and efficient interaction manner lowers a threshold for the user to produce video content, which may both improve the efficiency of producing video content and improve the user experience.

The following continues to describe an exemplary structure in which a multimedia data processing apparatus 454 provided in this embodiment of this application is implemented as a software module. In some embodiments, As shown in FIG. 3, a software module stored in a multimedia data processing apparatus 454 of a memory 450 may include: a first presentation module 4541, configured to present a session interface, where the session interface presents at least one multimedia message; a first determining module 4542 is configured to determine a first multimedia message in response to a first selection operation received through the session interface, the first multimedia message carrying first multimedia data; a second determining module 4543 is configured to determine second multimedia data in response to a second selection operation; a second presentation module 4544 is configured to present a synthesis interface in response to a multimedia synthesis instruction, the synthesis interface presenting the first multimedia data and the second multimedia data; and a first synthesis module 4545 is configured to perform synthesis processing on the first multimedia data and the second multimedia data to obtain synthesized multimedia data.

In some embodiments, the apparatus further includes: a second obtaining module, configured to obtain a first cover image of the first multimedia message in response to detecting that the first selection operation acts on a first display region of the first multimedia message; a first control module, configured to control the first cover image to be displayed in a manner of a floating layer; and a second control module, configured to control the first cover image to move with the first selection operation in response to detecting that the first selection operation triggers a movement instruction.

In some embodiments, a second determining module is further configured to determine that the second selection operation is received in response to detecting that the first selection operation acts on a second display region of a second multimedia message; and determine multimedia data carried in the second multimedia message as the second multimedia data.

In some embodiments, the apparatus further includes: an update display module, configured to update the second display region to a selected state in response to detecting that the first selection operation acts on the second display region of the second multimedia message; and a third presentation module, configured to present a prompt message that the first multimedia data is to be synthesized with the second multimedia data.

In some embodiments, the apparatus further includes: a third determining module, configured to determine, in response to detecting that the first selection operation does not act on other multimedia messages except the first multimedia message and detecting that the first selection operation ends, that an operation instruction for canceling multimedia splicing is received; and a display cancellation module, configured to cancel a first cover image displayed in a manner of a floating layer.

In some embodiments, the apparatus further includes: a fourth presentation module, configured to present, in response to the first selection operation, an operation option interface for the first multimedia message, where the operation option interface at least includes a multimedia splicing control; a fifth presentation module, configured to present, in response to a trigger operation for the multimedia splicing control, a multimedia data selection interface, where the multimedia data selection interface presents a plurality of pieces of selectable multimedia data; and a first receiving module, configured to receive the second selection operation through the multimedia data selection interface.

In some embodiments, a first synthesis module is further configured to: directly perform splicing on the first multimedia data and the second multimedia data to obtain the synthesized multimedia data when both the first multimedia data and the second multimedia data are video data; when both the first multimedia data and the second multimedia data are image data, generate first video data based on the first multimedia data, and generate second video data based on the second multimedia data; and perform splicing on the first video data and the second video data to obtain the synthesized multimedia data.

In some embodiments, the first synthesis module is further configured to: generate the first video data based on the first multimedia data when the first multimedia data is the image data and the second multimedia data is the video data; perform splicing on the first video data and the second multimedia data to obtain the synthesized multimedia data; generate the second video data based on the second multimedia data when the first multimedia data is the video data and the second multimedia data is the image data; and perform splicing on the first multimedia data and the second video data to obtain the synthesized multimedia data.

In some embodiments, a first synthesis module is further configured to: directly perform splicing on the first multimedia data and the second multimedia data to obtain the synthesized multimedia data when both the first multimedia data and the second multimedia data are voice data; generate third video data from the second multimedia data based on a playback duration of the first multimedia data when the first multimedia data is the voice data and the second multimedia data is image data; perform synthesis processing on the first multimedia data and the third video data to obtain the synthesized multimedia data; perform muting processing on the second multimedia data to obtain processed second multimedia data when the first multimedia data is the voice data and the second multimedia data is the video data; and perform synthesis processing on the first multimedia data and the processed second multimedia data to obtain the synthesized multimedia data.

In some embodiments, the apparatus further includes: a second receiving module, configured to receive a third selection operation for multimedia data presented in the synthesis interface; a fourth determining module, configured to determine target multimedia data corresponding to the third selection operation, and enter a multimedia data sorting state; a fifth determining module, configured to determine a sorting result of the multimedia data presented in the synthesis interface in response to a received movement operation of moving the target multimedia data; and a second synthesis module configured to synthesize, based on the sorting result, the multimedia data presented in the synthesis interface to obtain the synthesized multimedia data.

In some embodiments, the apparatus further includes: a third obtaining module, configured to determine, when a fourth selection operation is received through the session interface, a third multimedia message in response to the fourth selection operation, where the third multimedia message carries third multimedia data; a fourth obtaining module, configured to obtain a second cover image of the third multimedia message, and control the second cover image to be displayed in the manner of the floating layer; a third control module, configured to control the second cover image to move with the fourth selection operation in response to detecting that the fourth selection operation triggers a movement instruction; and a third synthesis module, configured to synthesize, in response to detecting that the fourth selection operation acts on a region in which the synthesis interface is located and the fourth selection operation ends, the third multimedia data, the first multimedia data, and the second multimedia data to obtain the synthesized multimedia data.

In some embodiments, the synthesis interface presents an adding control for continuing to add multimedia data, and the apparatus further includes: a sixth presentation module, configured to, when a trigger operation for the adding control is received, present, in response to the trigger operation, the multimedia data selection interface, where the multimedia data selection interface presents a plurality of pieces of selectable multimedia data; and a sixth determining module, configured to receive a fifth selection operation through the multimedia data selection interface, and determine selected fourth multimedia data in response to the fifth selection operation; and a fourth synthesis module, configured to synthesize the fourth multimedia data with the first multimedia data and the second multimedia data to obtain the synthesized multimedia data.

In some embodiments, the synthesis interface presents an editing control for multimedia data, and the apparatus further includes: a seventh presentation module, configured to present, in response to a received trigger operation for the editing control, an editing interface, where the editing interface presents a plurality of editing options; and an editing module, configured to perform editing processing on the synthesized multimedia data to obtain edited multimedia data in response to an editing operation received through the editing interface.

In some embodiments, the synthesis interface presents a sharing control, and the apparatus further includes: an eighth presentation module, configured to present, in response to a received trigger operation for the sharing control, a sharing option interface, where the sharing option interface presents a plurality of sharing options; a seventh determining module, configured to determine a target sharing option in response to a sixth selection operation received through the sharing option interface; and a sharing module, configured to present a sharing interface corresponding to the target sharing option, and share, in response to a sharing operation received through the sharing interface, spliced multimedia data.

The foregoing description of the multimedia data processing apparatus embodiment is similar to the description of the foregoing method embodiment, and has similar beneficial effects to the method embodiment. For technical details not disclosed in the multimedia data processing apparatus embodiment of this application, reference may be made to the description of the method embodiments of this application for understanding.

This embodiment of this application provides a computer program product or a computer program. The computer program product or the computer program includes computer instructions. The computer instructions are stored in a non-transitory computer-readable storage medium. A processor of a computer device reads the computer instructions from the computer-readable storage medium, and executes the computer instructions, to cause the computer device to perform the multimedia data processing method in this embodiment of this application.

This embodiment of this application provides a computer-readable storage medium storing executable instructions, the executable instructions, when executed by a processor, causing the processor to perform the method provided in this embodiment of this application. For example, the method shown in FIG. 4, FIG. 5, and FIG. 6.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a Hyper Text Markup Language (HTML) file, stored in a file that is specially used for a program in discussion, or stored in a plurality of collaborative files (for example, be stored in files of one or more modules, subprograms, or code parts).

As an example, the executable instructions may be deployed to be executed on a computing device (e.g., an electronic device), or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs presentation and/or synthesis. In practical application, the foregoing functions may be allocated to and completed by different functional modules according to requirements, that is, an inner structure of a device is divided into different functional modules to implement all or a part of the functions described above.

What is claimed is:

1. A multimedia data processing method, performed at an electronic device having a display, the method comprising:
presenting a session interface on the display, the session interface;
determining a first multimedia message in response to receiving a first selection operation through the session interface, the first multimedia message carrying first multimedia data;
obtaining a first cover image of the first multimedia message in response to detecting that the first selection operation acts on a first display location, of the session interface, associated with the first multimedia message;
displaying the first cover image as a floating layer;
in response to detecting that the first selection operation triggers a movement instruction, controlling the floating layer corresponding to the first cover image to move with the first selection operation;
selecting a second multimedia message in response to detecting that the movement instruction has moved the floating layer, corresponding to the first cover image, to a second display location, of the session interface, associated with the second multimedia message, the second multimedia message carrying second multimedia data;

in response to receiving a multimedia synthesis instruction, displaying a synthesis interface, the synthesis interface presenting the first multimedia data and the second multimedia data; and performing synthesis processing on the first multimedia data and the second multimedia data to obtain synthesized multimedia data.

2. The method according to claim 1, further comprising:
updating the second display location to a selected state in response to detecting that the first selection operation acts on the second display location of the second multimedia message; and
presenting a prompt message that the first multimedia data is to be synthesized with the second multimedia data.

3. The method according to claim 1, further comprising:
in response to the first selection operation, presenting an operation option interface for the first multimedia message, wherein the operation option interface comprises at least a multimedia splicing control; and
in response to a trigger operation for the multimedia splicing control, presenting a multimedia data selection interface, wherein the multimedia data selection interface presents a plurality of pieces of selectable multimedia data.

4. The method according to claim 1, wherein performing synthesis processing on the first multimedia data and the second multimedia data to obtain synthesized multimedia data comprises:
in accordance with a determination that both the first multimedia data and the second multimedia data are video data, directly splicing the first multimedia data and the second multimedia data to obtain the synthesized multimedia data; and
in accordance with a determination that both the first multimedia data and the second multimedia data are image data:
generating first video data based on the first multimedia data, and generating second video data based on the second multimedia data; and
performing splicing on the first video data and the second video data to obtain the synthesized multimedia data.

5. The method according to claim 1, wherein performing synthesis processing on the first multimedia data and the second multimedia data to obtain synthesized multimedia data comprises:
in accordance with a determination that the first multimedia data is image data and the second multimedia data is video data:
generating first video data based on the first multimedia data; and
performing splicing on the first video data and the second multimedia data to obtain the synthesized multimedia data; and
in accordance with a determination that the first multimedia data is the video data and the second multimedia data is the image data:
generating second video data based on the second multimedia data; and
performing splicing on the first multimedia data and the second video data to obtain the synthesized multimedia data.

6. The method according to claim 1, wherein performing synthesis processing on the first multimedia data and the second multimedia data to obtain synthesized multimedia data comprises:
in accordance with a determination that both the first multimedia data and the second multimedia data are voice data, directly splicing the first multimedia data and the second multimedia data to obtain the synthesized multimedia data;
in accordance with a determination that the first multimedia data is voice data and the second multimedia data is image data:
generating third video data from the second multimedia data based on a playback duration of the first multimedia data; and
performing synthesis processing on the first multimedia data and the third video data to obtain the synthesized multimedia data;
in accordance with a determination that the first multimedia data is voice data and the second multimedia data is video data:
performing a muting operation on the second multimedia data to obtain processed second multimedia data; and
performing synthesis processing on the first multimedia data and the processed second multimedia data to obtain the synthesized multimedia data.

7. The method according to claim 1, further comprising after presenting the synthesis interface:
receiving a third selection operation for multimedia data presented in the synthesis interface;
determining target multimedia data corresponding to the third selection operation, and entering a multimedia data sorting state;
in response to receiving a user interaction specifying reordering of the target multimedia data, determining a sorting result of the multimedia data presented in the synthesis interface; and
synthesizing, based on the sorting result, the multimedia data presented in the synthesis interface to obtain the synthesized multimedia data.

8. The method according to claim 1, further comprising after presenting the synthesis interface:
in accordance with receiving a fourth selection operation through the session interface, determining a third multimedia message in response to the fourth selection operation, wherein the third multimedia message carries third multimedia data;
obtaining a second cover image of the third multimedia data, and displaying the second cover image as a floating layer;
controlling the second cover image to move with the fourth selection operation in response to detecting that the fourth selection operation triggers a movement instruction; and
synthesizing, in response to detecting that the fourth selection operation acts on a region in which the synthesis interface is located and the fourth selection operation ends, the third multimedia data with the first multimedia data and the second multimedia data to obtain the synthesized multimedia data.

9. The method according to claim 1, wherein:
the synthesis interface presents an adding control for continuing to add multimedia data; and
the method further comprises:
in accordance with receiving a trigger operation for the adding control, presenting a multimedia data selection interface, wherein the multimedia data selection interface presents a plurality of pieces of selectable multimedia data;

receiving a fifth selection operation through the multimedia data selection interface, and determining a fourth multimedia data in response to the fifth selection operation; and synthesizing the fourth multimedia data with the first multimedia data and the second multimedia data to obtain the synthesized multimedia data.

10. The method according to claim 1, wherein:

the synthesis interface presents an editing control for multimedia data; and the method further comprises:

in response to receiving a trigger operation for the editing control, presenting an editing interface, wherein the editing interface includes a plurality of editing options; and performing editing processing on the synthesized multimedia data to obtain edited multimedia data in response to an editing operation received through the editing interface.

11. The method according to claim 1, wherein:

the synthesis interface presents a sharing control; and the method further comprises:

in response to receiving a trigger operation for the sharing control, presenting a sharing option interface, wherein the sharing option interface includes a plurality of sharing options;

determining a target sharing option in response to receiving a selection operation through the sharing option interface;

presenting a sharing interface corresponding to the target sharing option; and in response to a sharing operation received through the sharing interface, sharing spliced multimedia data with a computing device that is distinct from the electronic device.

12. An electronic device, comprising:

a display;

one or more processors; and memory storing one or more programs, the one or more programs comprising instructions that, when executed by the one or more processors, cause the one or more processors to:

present a session interface on the display, the session interface including at least one multimedia message;

determine a first multimedia message in response to receiving a first selection operation through the session interface, the first multimedia message carrying first multimedia data;

obtain a first cover image of the first multimedia message in response to detecting that the first selection operation acts on a first display location, of the session interface, associated with the first multimedia message;

display the first cover image as a floating layer;

in response to detecting that the first selection operation triggers a movement instruction, control the floating layer corresponding to the first cover image to move with the first selection operation;

select a second multimedia message in response to detecting that the movement instruction has moved the floating layer, corresponding to the first cover image, to a second display location, of the session interface, associated with the second multimedia message, the second multimedia message carrying second multimedia data;

in response to receiving a multimedia synthesis instruction, displaying a synthesis interface, the synthesis interface presenting the first multimedia data and the second multimedia data; and performing synthesis processing on the first multimedia data and the second multimedia data to obtain synthesized multimedia data.

13. The electronic device according to claim 12, wherein the instructions, when executed by the one or more processors, further cause the one or more processors to:

update the second display location to a selected state in response to detecting that the first selection operation acts on the second display location of the second multimedia message; and present a prompt message that the first multimedia data is to be synthesized with the second multimedia data.

14. The electronic device according to claim 12, wherein the instructions, when executed by the one or more processors, further cause the one or more processors to perform synthesis processing on the first multimedia data and the second multimedia data to obtain synthesized multimedia data by:

in accordance with a determination that both the first multimedia data and the second multimedia data are video data, directly splicing the first multimedia data and the second multimedia data to obtain the synthesized multimedia data; and in accordance with a determination that both the first multimedia data and the second multimedia data are image data:

generating first video data based on the first multimedia data, and generating second video data based on the second multimedia data; and performing splicing on the first video data and the second video data to obtain the synthesized multimedia data.

15. The electronic device according to claim 12, wherein the instructions, when executed by the one or more processors, further cause the one or more processors to perform synthesis processing on the first multimedia data and the second multimedia data to obtain synthesized multimedia data by:

in accordance with a determination that the first multimedia data is image data and the second multimedia data is video data:

generating first video data based on the first multimedia data; and performing splicing on the first video data and the second multimedia data to obtain the synthesized multimedia data; and in accordance with a determination that the first multimedia data is the video data and the second multimedia data is the image data:

generating second video data based on the second multimedia data; and performing splicing on the first multimedia data and the second video data to obtain the synthesized multimedia data.

16. The electronic device according to claim 12, wherein the instructions, when executed by the one or more processors, further cause the one or more processors to perform synthesis processing on the first multimedia data and the second multimedia data to obtain synthesized multimedia data by:

in accordance with a determination that both the first multimedia data and the second multimedia data are voice data, directly splicing the first multimedia data and the second multimedia data to obtain the synthesized multimedia data;
in accordance with a determination that the first multimedia data is voice data and the second multimedia data is image data:
generating third video data from the second multimedia data based on a playback duration of the first multimedia data; and
performing synthesis processing on the first multimedia data and the third video data to obtain the synthesized multimedia data;
in accordance with a determination that the first multimedia data is voice data and the second multimedia data is video data:
performing a muting operation on the second multimedia data to obtain processed second multimedia data; and
performing synthesis processing on the first multimedia data and the processed second multimedia data to obtain the synthesized multimedia data.

17. A non-transitory computer-readable storage medium, storing computer readable instructions that, when executed by a processor, cause a data processing system to perform:
presenting a session interface on a display;
determining a first multimedia message in response to receiving a first selection operation through the session interface, the first multimedia message carrying first multimedia data;
obtaining a first cover image of the first multimedia message in response to detecting that the first selection operation acts on a first display location, of the session interface, associated with the first multimedia message;
displaying the first cover image as a floating layer;
in response to detecting that the first selection operation triggers a movement instruction, controlling the floating layer corresponding to the first cover image to move with the first selection operation;
selecting a second multimedia message in response to detecting that the movement instruction has moved the floating layer, corresponding to the first cover image, to a second display location, of the session interface, associated with the second multimedia message, the second multimedia message carrying second multimedia data;
in response to receiving a multimedia synthesis instruction, displaying a synthesis interface, the synthesis interface presenting the first multimedia data and the second multimedia data; and
performing synthesis processing on the first multimedia data and the second multimedia data to obtain synthesized multimedia data.

18. The non-transitory computer-readable storage medium according to claim 17, wherein the computer readable instructions that, when executed by the processor, further cause the data processing system to perform:
in response to the first selection operation, presenting an operation option interface for the first multimedia message, wherein the operation option interface comprises at least a multimedia splicing control; and
in response to a trigger operation for the multimedia splicing control, presenting a multimedia data selection interface, wherein the multimedia data selection interface presents a plurality of pieces of selectable multimedia data.

19. The non-transitory computer-readable storage medium according to claim 17, wherein the computer readable instructions that, when executed by the processor, further cause the data processing system to perform synthesis processing on the first multimedia data and the second multimedia data to obtain synthesized multimedia data by:
in accordance with a determination that both the first multimedia data and the second multimedia data are video data, directly splicing the first multimedia data and the second multimedia data to obtain the synthesized multimedia data; and
in accordance with a determination that both the first multimedia data and the second multimedia data are image data:
generating first video data based on the first multimedia data, and generating second video data based on the second multimedia data; and
performing splicing on the first video data and the second video data to obtain the synthesized multimedia data.

20. The non-transitory computer-readable storage medium according to claim 17, wherein the computer readable instructions that, when executed by the processor, further cause the data processing system to perform synthesis processing on the first multimedia data and the second multimedia data to obtain synthesized multimedia data by:
in accordance with a determination that both the first multimedia data and the second multimedia data are voice data, directly splicing the first multimedia data and the second multimedia data to obtain the synthesized multimedia data;
in accordance with a determination that the first multimedia data is voice data and the second multimedia data is image data:
generating third video data from the second multimedia data based on a playback duration of the first multimedia data; and
performing synthesis processing on the first multimedia data and the third video data to obtain the synthesized multimedia data;
in accordance with a determination that the first multimedia data is voice data and the second multimedia data is video data:
performing a muting operation on the second multimedia data to obtain processed second multimedia data; and
performing synthesis processing on the first multimedia data and the processed second multimedia data to obtain the synthesized multimedia data.

* * * * *